United States Patent
Liu et al.

(10) Patent No.: US 9,492,795 B2
(45) Date of Patent: Nov. 15, 2016

(54) MEMBRANE DEVICE AND PROCESS FOR MASS EXCHANGE, SEPARATION, AND FILTRATION

(71) Applicant: BATTELLE MEMORIAL INSTITUTE, Richland, WA (US)

(72) Inventors: Wei Liu, Richland, WA (US); Nathan L. Canfield, Richland, WA (US)

(73) Assignee: Battelle Memorial Institute, Richland, WA (US)

(*) Notice: Subject to any disclaimer, the term of this patent is extended or adjusted under 35 U.S.C. 154(b) by 289 days.

(21) Appl. No.: 14/185,706

(22) Filed: Feb. 20, 2014

(65) Prior Publication Data

US 2014/0238235 A1    Aug. 28, 2014

Related U.S. Application Data

(60) Provisional application No. 61/768,124, filed on Feb. 22, 2013.

(51) Int. Cl.
*B01D 53/22* (2006.01)
*B01D 71/02* (2006.01)
(Continued)

(52) U.S. Cl.
CPC ............. *B01D 71/022* (2013.01); *B01D 53/02* (2013.01); *B01D 53/228* (2013.01);
(Continued)

(58) Field of Classification Search
CPC ............. B01D 63/085; B01D 63/084; B01D 63/082; B01D 71/022; B01D 53/02; B01D 53/228; B01D 53/268; B01D 63/081; B01D 65/02; B01D 61/02; B01D 61/14; B01D 71/028; B01D 2253/108; B01D 2257/504; B01D 2311/13; B01D 2315/10; F24F 3/14; Y02C 10/10
See application file for complete search history.

(56) References Cited

U.S. PATENT DOCUMENTS 3,897,339 A * 7/1975 Arndt ................... B01D 24/045
    210/283
4,310,416 A * 1/1982 Tanaka ................... B01D 61/28
    210/321.75
(Continued)

FOREIGN PATENT DOCUMENTS

CA         2245334 A1    2/2000
WO    WO 2012/094764 A1    7/2012

OTHER PUBLICATIONS

International Search Report/Written Opinion for International Application No. PCT/US2014/017609, International filing date Feb. 21, 2014, Date of Mailing Jun. 5, 2014, 12 pgs.

Primary Examiner — Anthony Shumate
(74) Attorney, Agent, or Firm — Klarquist Sparkman, LLP

(57) ABSTRACT

A membrane device and processes for fabrication and for using are disclosed. The membrane device may include a number of porous metal membranes that provide a high membrane surface area per unit volume. The membrane device provides various operation modes that enhance throughput and selectivity for mass exchange, mass transfer, separation, and/or filtration applications between feed flow streams and permeate flow streams.

21 Claims, 11 Drawing Sheets

(51) Int. Cl.
  *B01D 63/08* (2006.01)
  *B01D 65/02* (2006.01)
  *B01D 53/26* (2006.01)
  *B01D 53/02* (2006.01)
  *F24F 3/14* (2006.01)
  *B01D 61/02* (2006.01)
  *B01D 61/14* (2006.01)

(52) U.S. Cl.
  CPC ........... *B01D 53/268* (2013.01); *B01D 63/081* (2013.01); *B01D 63/082* (2013.01); *B01D 63/084* (2013.01); *B01D 63/085* (2013.01); *B01D 65/02* (2013.01); *F24F 3/14* (2013.01); *B01D 61/02* (2013.01); *B01D 61/14* (2013.01); *B01D 71/028* (2013.01); *B01D 2253/108* (2013.01); *B01D 2257/504* (2013.01); *B01D 2311/13* (2013.01); *B01D 2315/10* (2013.01); *Y02C 10/10* (2013.01); *Y10T 29/49826* (2015.01)

(56) References Cited

U.S. PATENT DOCUMENTS

| | | | | |
|---|---|---|---|---|
| 4,832,115 | A * | 5/1989 | Albers | B01D 1/14 165/104.31 |
| 4,900,448 | A * | 2/1990 | Bonne | B01D 53/268 210/321.8 |
| 5,605,628 | A * | 2/1997 | Davidson | B01D 67/0041 210/321.83 |
| 5,624,555 | A * | 4/1997 | Kutowy | B01D 63/084 210/224 |
| 5,798,049 | A * | 8/1998 | Proulx | B01D 25/001 210/321.74 |
| 6,197,203 | B1 * | 3/2001 | Ishida | B01D 61/16 210/748.11 |
| 7,143,597 | B2 * | 12/2006 | Hyland | F24F 5/0035 62/236 |
| 7,197,887 | B2 * | 4/2007 | Maisotsenko | F24F 3/1411 165/165 |
| 7,258,329 | B2 * | 8/2007 | Sasamoto | H01M 8/02 261/104 |
| 7,264,724 | B2 * | 9/2007 | Vigna | B01D 3/20 210/321.61 |
| 7,279,215 | B2 * | 10/2007 | Hester | B01D 63/082 210/321.64 |
| 7,316,780 | B1 * | 1/2008 | Fendya | A23C 9/1422 210/503 |
| 7,404,848 | B2 * | 7/2008 | Okada | H01M 8/0273 156/326 |
| 7,527,661 | B2 * | 5/2009 | Chellappa | B01J 19/0093 422/198 |
| 7,585,355 | B2 * | 9/2009 | Gonjo | F28F 3/083 210/640 |
| 7,691,266 | B2 * | 4/2010 | Fendya | A23C 9/1422 210/321.72 |
| 7,875,106 | B2 | 1/2011 | Liu | |
| 8,020,516 | B2 * | 9/2011 | Labra Reynolds | A01K 61/002 119/238 |
| 8,623,210 | B2 * | 1/2014 | Manabe | B01D 63/082 210/231 |
| 8,673,067 | B2 | 3/2014 | Liu et al. | |
| 8,876,943 | B2 * | 11/2014 | Gottlieb | B01D 19/0031 95/46 |
| 8,919,746 | B2 * | 12/2014 | Vanderwees | H01M 8/04074 261/102 |
| 9,101,874 | B2 * | 8/2015 | Vandermeulen | F28F 1/02 |
| 9,101,875 | B2 * | 8/2015 | Vandermeulen | F28F 1/02 |
| 9,203,097 | B2 * | 12/2015 | Martinchek | H01M 8/0228 |
| 2002/0104439 | A1 * | 8/2002 | Komkova | B01D 53/22 96/4 |
| 2003/0209480 | A1 * | 11/2003 | Kneifel | B01D 53/22 210/321.8 |
| 2004/0061245 | A1 * | 4/2004 | Maisotsenko | F02B 29/0462 261/153 |
| 2004/0109798 | A1 * | 6/2004 | Chopard | B01D 63/082 422/198 |
| 2004/0226877 | A1 * | 11/2004 | Karode | B01D 63/08 210/321.85 |
| 2005/0130016 | A1 * | 6/2005 | Yang | H01M 8/0258 429/465 |
| 2006/0090650 | A1 | 5/2006 | Yamakawa et al. | |
| 2008/0085437 | A1 * | 4/2008 | Dean | B01D 53/268 429/413 |
| 2008/0251444 | A1 * | 10/2008 | Fendya | A23C 9/1422 210/487 |
| 2009/0008316 | A1 * | 1/2009 | Verhaeghe | B01D 25/26 210/230 |
| 2010/0304953 | A1 | 12/2010 | Liu et al. | |
| 2010/0311157 | A1 * | 12/2010 | Van Alstyne | C10L 1/02 435/294.1 |
| 2011/0052466 | A1 | 3/2011 | Liu | |
| 2011/0155662 | A1 | 6/2011 | Liu et al. | |
| 2011/0258837 | A1 * | 10/2011 | Scannon | G05B 19/4188 29/592 |
| 2012/0111784 | A1 * | 5/2012 | Morita | B01D 29/39 210/232 |
| 2012/0118145 | A1 | 5/2012 | Claridge et al. | |
| 2012/0118147 | A1 | 5/2012 | Claridge et al. | |
| 2012/0181712 | A1 * | 7/2012 | Vanderwees | H01M 8/04074 261/102 |
| 2012/0228213 | A1 * | 9/2012 | Ishii | B01D 63/082 210/490 |
| 2012/0252105 | A1 * | 10/2012 | Ahrens | C12M 21/02 435/257.3 |
| 2013/0017416 | A1 * | 1/2013 | Goeting | B01D 61/50 429/2 |
| 2013/0186121 | A1 * | 7/2013 | Erb | F24F 3/1417 62/238.1 |
| 2014/0251810 | A1 * | 9/2014 | Lepa | B01D 61/50 204/539 |
| 2014/0260398 | A1 * | 9/2014 | Kozubal | F25B 15/00 62/271 |
| 2014/0262991 | A1 * | 9/2014 | Edinger | C02F 1/001 210/97 |
| 2015/0377562 | A1 * | 12/2015 | Buckrell | B23P 15/26 165/181 |

* cited by examiner

MEMBRANE DEVICE AND PROCESS FOR MASS EXCHANGE, SEPARATION, AND FILTRATION

CROSS REFERENCE TO RELATED APPLICATION

This is a Non-Provisional application that claims priority from U.S. Provisional Application No. 61/768,124 filed 22 Feb. 2013 entitled "Membrane Device and Process for Mass Exchange, Separation, and Filtration", which reference is incorporated in its entirety herein.

STATEMENT REGARDING RIGHTS TO INVENTION MADE UNDER FEDERALLY-SPONSORED RESEARCH AND DEVELOPMENT

This invention was made with Government support Contract DE-AC05-76RL01830 awarded by the U.S. Department of Energy. The Government has certain rights in the invention.

BACKGROUND OF THE INVENTION

Low-cost, high surface area inorganic membrane modules have been long sought by industry because of unique performance attributes of both metallic and ceramic materials. In order to be easily deployed, membrane modules need to include a compact form. Conventional reverse osmosis (RO) membranes packed with polymer membranes can provide a large membrane surface area per unit volume. However, reverse osmosis (RO) membranes are ineffective for mass transfer applications due to an inability to process sweep (i.e., gas) flow streams. RO-type membranes with their cylindrical designs are also limited by channel dimensions that can lead to large pressure drops when placed under vacuum. In addition, conventional filters that employ metal or ceramic tubes have a membrane packing density that is typically lower than polymer membranes by nearly one order of magnitude. In addition, spiral-wound RO membrane filters and plate-type RO membrane filters commonly used for desalination of sea water and for treatment of waste water in bio-reactors, respectively, provide filtration of only a single flow stream in a single flow direction. Neither filter can process dual flow streams simultaneously, which eliminates mass transfer and heat transfer between two flow streams. And, membrane filters designed for liquid-phase filtration are not suitable for vapor-phase separation at low pressures or under vacuum where pressure drops become a significant concern. Accordingly, new membrane designs are needed that provide high mass transfer rates with minimal pressure drops for liquid and vapor-phase separation and filtration applications. The present invention addresses these needs.

SUMMARY OF THE INVENTION

The present invention includes a membrane device that finds applications in mass-exchange, mass-transfer, heat-transfer, separation, filtration. The membrane device may include one or more membrane cassettes that are stacked together to form a membrane module. Each membrane cassette may include a support frame constructed of a selected material (e.g., metal or plastic). Porous metal sheet membranes may be mounted to respective sides of the support frame. The membrane cassettes in the stack provide a number of feed flow slots and permeate (or sweep) flow slots on respective sides of the membrane device with flow channels that transport selected fluids or molecules in a feed flow stream across the surfaces of the porous membranes in the membrane cassettes during operation. Feed slots may transport selected fluids or molecules through the membrane device in a cross-current flow pattern or a counter-current flow pattern. Porous metal membranes provide a selected mass exchange for components within a feed flow stream introduced to the membrane device and a permeate flow stream removed from the membrane device during operation. Porous metal membranes may include or be constructed of various metals and metal alloys. Metals and metal alloys include, but are not limited to, e.g., nickel (Ni) metal, nickel-iron (Ni—Fe) alloys, nickel-copper (Ni—Cu) alloys, stainless steel alloys, titanium (Ti) metal, titanium alloys, including combinations of these various metals and metal alloys.

The membrane module separates or filters particulates or molecules of a selected size from the feed flow streams introduced into the membrane device. The support frame may include depressions positioned on respective faces of the support frame that form feed flow slots and permeate (or sweep) flow slots in each of the membrane cassettes in the membrane device. Feed slots on selected sides of the membrane device are oriented in a direction 90 degrees from permeate (or sweep gas) slots on other sides of the membrane device.

Porous metal membranes may be separated a selected distance apart on the support frame of the membrane cassettes. The membranes provide filtration or separation of particulates from feed streams introduced through the feed slots of the metal cassettes in the membrane device In some applications, the porous metal membranes may be symmetric membranes. In some applications, the porous metal membranes may be asymmetric membranes. Porous metal membranes may include pores of a size between about 0.010 µm and about 10 µm.

Porous metal membranes may have a selected thickness. Thickness of the membranes may be selected to reduce or minimize transport resistance of the selected molecule or materials across the membranes of the membrane device. Porous metal sheet membranes may have a thickness selected between about 20 µm and about 200 µm.

Membranes in the membrane device allow two process flow streams to remain separated from the other process flow stream while allowing selected molecules or selected materials to cross through the membranes.

Porous metal sheet membranes in the membrane cassettes may include a backing material constructed of one or more layers of a porous or fluid-permeable material or structure placed on the rear or back side of the membranes to support the membranes in the membrane cassettes. Backing materials may include, but are not limited to, e.g., polymers, metals, and combinations of these materials. In some applications, the backing material may include a porous polyester sheet. In some applications, the backing material may include a porous polyester sheet that is conjugated with a metal mesh. Backing materials minimize flow resistance for sweep flow streams to flow through the membrane cassettes between the back surfaces of the two membrane sheets. Flow direction during mass-transfer may be parallel to the membrane surface.

Backing materials may include a thickness selected between about 0.05 mm and about 5.0 mm. Backing materials may include a porosity defined by the ratio of the open area to total area of between about 0.2 and about 0.95.

Backing materials may include pore openings with a size selected between about 0.01 mm and about 5.0 mm that permit the permeate to flow out of the membrane cassettes of the membrane device with minimal pressure drops characterized by permeance values listed herein.

Backing materials for liquid-phase filtration or separation may include a permeance greater than about 50 liters/$m^2$/hr/bar. Pressure drops for liquid-phase sweep flow streams passing through the backing materials are preferably less than about 1 bar. Backing materials for gas-phase filtration or separation may include a permeance greater than about 1.0E-5 mol/$m^2$/s/Pa. Pressure drops for gas-phase sweep flow streams passing through the backing materials are preferably less than about 0.1 bar.

Backing materials may include a hydraulic diameter for sweep flow streams to pass to flow through the backing materials through the membrane cassette preferably between about 0.3 mm and about 5.0 mm.

Backing materials also enable porous metal sheet membranes to withstand a pressure gradient of about 1 bar or larger positioned between the feed side of the membranes and the permeate side of the membranes of the membrane device.

In some applications, membrane cassettes may include a spacer material disposed between the backing materials on the rear side of the porous metal membranes. Spacers may be constructed of corrugated metals or other suitable corrugated materials. Spacing materials serve to maintain a selected separation distance between the porous metal membranes in the membrane cassettes of the membrane module. In various applications, separation distance between membrane surfaces is between about 0.5 mm and about 10.0 mm. Spacer materials may also provide straight feed flow channels inside the membrane cassettes with openings that include a diameter dimension selected between about 0.3 mm and about 3.0 mm.

Spacers may serve to minimize mass-transfer resistance between bulk flow streams and membrane surfaces that permits flow streams to flow with minimal pressure drops.

In some applications, spacer materials may be positioned between individual cassettes in the stack of membrane cassettes in the membrane device.

Feed slots may include openings with a diameter dimension selected between about 0.3 mm and about 5.0 mm. Permeate slots may include openings with a diameter dimension selected between about 0.3 mm and about 3.0 mm.

The membrane device may include manifolds that attach to feed and permeate slots of the membrane module on respective sides of the one or more membrane cassettes. Manifolds may deliver at least one feed flow stream uniformly into the flow slots on a first side of the membrane device and collect one or more flow streams through permeate flow slots on one or more sides of the membrane device different from those on the first side of the membrane device. Feed slots of the membrane device may transport selected fluids or molecules in the feed stream across the porous metal membranes of the one or more membrane cassettes within the membrane device.

In some applications, at least one of the porous metal membranes in the membrane cassettes may include a zeolite layer (membrane) of a selected thickness on the porous membrane constructed of a selected zeolite. The zeolite membrane may be configured to remove a selected atom or molecule from a feed stream introduced into the membrane device under a pressure gradient that yields a permeate stream in which the selected atom or molecule is absent. The zeolite membrane may be a water-selective membrane with pores of a selected size that provide a water permeance greater than or equal to about 1E-06 Mol/$m^2$/Pa/s for selective removal of water from a feed stream introduced into the membrane device.

In some applications, water-selective zeolite membranes may be used to remove water molecules from a fluid stream containing other molecules in addition to water such as water/alcohol mixtures. Selectivity for water over the other molecules is preferably above about 10. In some applications, removal of the selected molecules may be a continuous process conducted under constant pressures and temperatures.

In some applications, the feed stream introduced into the membrane device may be humid air introduced at a temperature above 10° C. with a relative humidity of at least about 10%. More than 20% of the moisture in the feed air stream may be removed in one-pass as the humid feed air flows through the membrane module, as assessed by the partial pressure differential of water vapor between the membranes of the membrane device.

In some applications, water-selective zeolite membranes may be used to remove moisture from a gas stream such as air. Selectivity for water over the other molecules is preferably above about 100. The membrane module can be used for building air dehumidification or conditioning, and can also be used in various gas-drying processes including, e.g., industrial-scale and building-scale dehumidification or conditioning processes. No limitations are intended.

In some applications, the membrane device may be used to transport one kind of molecule introduced in a feed stream from one side of the membrane device into a sweep stream released from another side of the membrane device. Examples include exchange of moisture between humid air and dry air in the membrane device. In some applications, the process may include introducing a feed stream of humid air into the membrane device and releasing a sweep stream containing dry air from the permeate side of the membrane device.

In various applications, the membrane device may be used to provide filtration or separation by delivering process flows through the membranes of the device in a cross-current or a counter-current fashion.

In some applications, the membrane device may be used in concert with a pressure gradient positioned between the feed side and the permeate side of the membrane device for applications including, but not limited to, e.g., molecular separation or filtration of particulates.

In some applications, the membrane device may be used to filter particulates from process flow streams, such as filtering algae from an algae-containing flow stream to harvest the algae. In some applications, the membrane device may be used to filter algae from a culture solution under a pressure gradient positioned between a feed side and a permeate side of the membrane device. In some applications, the feed stream may contain algae and be introduced into the membrane device. A feed stream released from the membrane device may contain a greater concentration of algae. A permeate flow stream released from the membrane device may include water collected from the feed stream.

In some applications, the membrane device may allow back-flushing by reversing a pressure gradient between the permeate side and the feed side of the membrane device. In this mode of operation, filtration and/or separation of particulates or molecules of a selected size may be conducted by first holding a pressure on the feed side of the membrane device for a period of time that is higher than the pressure on the permeate side. Then, the pressure on the permeate side may be raised above the pressure on the feed side of the membrane device for a selected time to allow fluid in the permeate stream to flow back through membranes in the membrane device into the feed side to wash away any deposits of solids on the membrane surfaces.

In some applications, the process may include connecting manifolds to feed slots and permeate slots on respective sides of the membrane device to accumulate or collect respective flow streams into and out of the membrane device.

The present invention also includes a process that includes delivering a feed stream that includes a component to be filtered or separated through a membrane device. The membrane device may include one or more membrane cassettes in a stack. The membrane cassettes may include porous metal membranes with a selected thickness, porosity, and surface area positioned on respective sides of a support frame. Membrane cassettes provide feed flow slots that are positioned on at least one side of the membrane device that transport the feed stream across the membranes. Permeate flow slots positioned on at least one other side of the membrane device may deliver at least one permeate stream from the membrane device without the filtered or separated component.

In some applications, the feed stream may be delivered through the membrane device in a counter-current flow direction or a cross-current flow direction relative to the permeate flow stream. A pressure gradient at or above 1 bar may be positioned between the feed side of the membrane device and the permeate side of the membrane device to filter and/or separate the component from the feed stream. In some applications, the feed stream may be delivered through one or more porous metal membranes of the membrane cassettes in the membrane device with a pressure drop of less than 1 bar. The feed stream may transport a selected molecule or component in the feed stream through the porous metal membranes of the one or more membrane cassettes and deliver the feed stream into a permeate stream delivered from the permeate side of the membrane device.

In some applications, the feed stream may be humid air which may be introduced into the membrane device with a relative humidity up to 80%. A permeate stream may be released from the membrane device that includes dry air with a relative humidity below about 50%.

The present invention also includes a process for fabrication of a membrane device. The process may include assembling one or more membrane cassettes together in a stack of membrane cassettes. Each membrane cassette may include a support frame with porous metal membranes positioned on respective sides of the support frame. The stack of membrane cassettes may provide feed flow slots and permeate (or sweep) flow slots on respective sides of the membrane device with flow channels that allow transport of selected fluids or molecules across the surfaces of the porous membranes in the membrane cassettes to separate or filter particulates or molecules of a selected size from fluids (e.g., feed flow streams) introduced into the membrane device.

Various advantages and novel features of the present invention are described herein and will become readily apparent to those of ordinary skill in the art from the descriptions and demonstrations set forth herein. As will be realized, the invention is capable of modification in various respects without departing from the spirit and scope of the present invention. Accordingly, the following drawings and descriptions of the present invention should be seen as illustrative of the invention and not as limiting in any way.

DETAILED DESCRIPTION

A membrane device and process of fabrication and uses are detailed. The membrane device may be configured for both counter-current and cross-current flows for applications including, but not limited to, e.g., mass transfer, heat transfer, mass exchange, filtration, separation, and dehumidification.

The following description includes a preferred best mode of one embodiment of the present invention. It will be clear from the description that the invention is not limited to these illustrated embodiments. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims. Therefore the present description should be seen as illustrative and not limiting.

Figure 1:
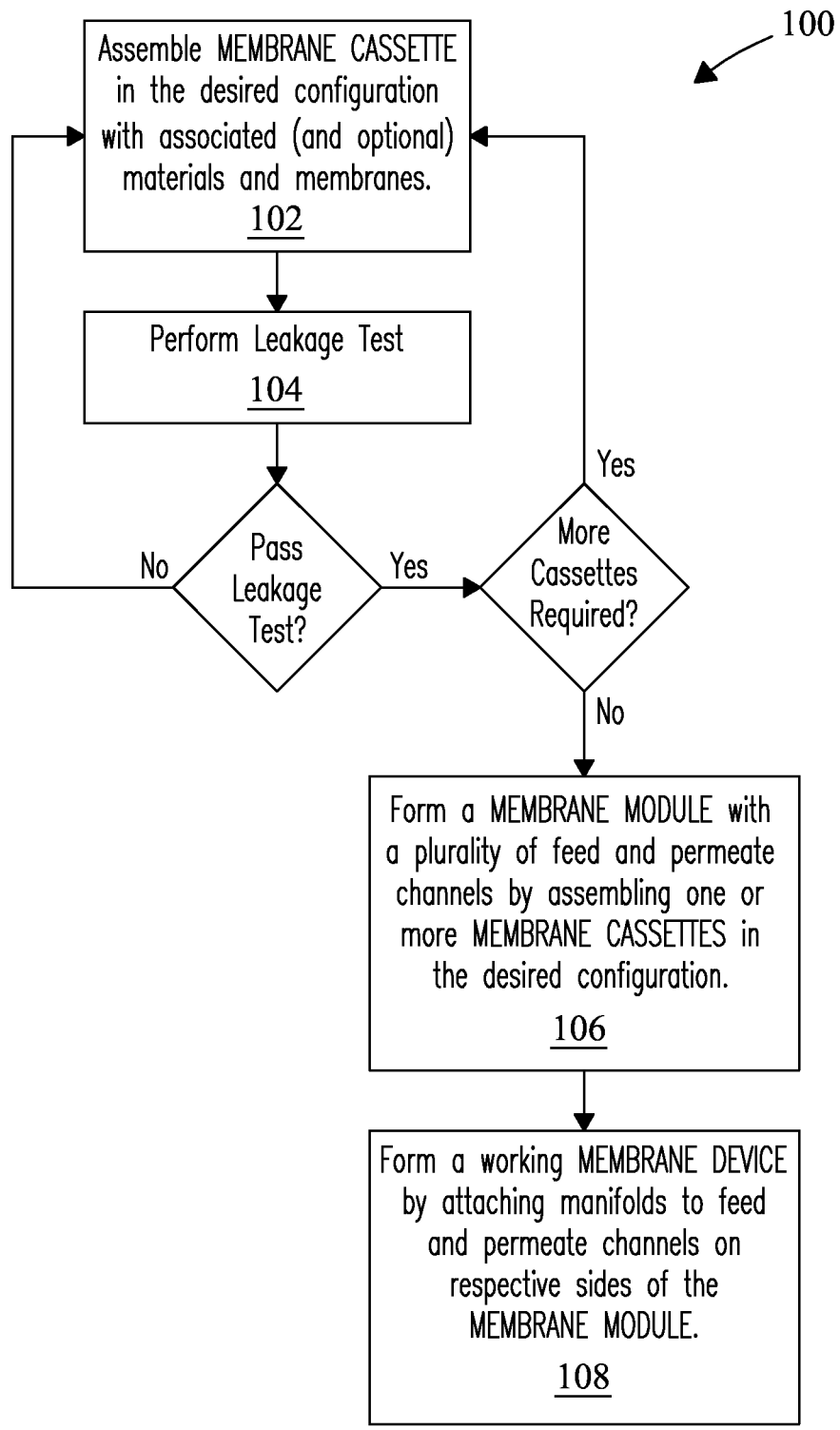
FIG. 1 presents an exemplary process for fabrication of a membrane device of the present invention.

FIG. 1 presents an exemplary process for assembly of a membrane device of the present invention. {START}. A single membrane cassette may be assembled by attaching two porous metal [e.g., nickel (Ni)] membranes onto a support frame. First {102}, a sheet of backing material such as a porous polyester may be attached to the rear side of each of the metal membranes positioned on respective sides of the membrane cassette. A corrugated metal mesh may be optionally positioned between the two sheets of backing materials to form flow channels within the membrane cassette. Membranes and other optional materials may be attached to the support frame with adhesive and cured under a weight bearing load to form the membrane cassette. Next {104}, the membrane cassette may be tested for leaks. If the assembled membrane cassette fails the leak test, a new membrane cassette can be constructed. If the assembled membrane cassette passes the leak test, additional membrane cassettes may be constructed and tested. Next {106}, one or more membrane cassettes may be assembled and bonded together in a stack of membrane cassettes to form a membrane module. A spacer described herein may be positioned between the membrane cassettes to separate the cassettes in the membrane module. Membrane module may include a plurality of feed slots into and out of membrane device and permeate (or sweep gas) slots into and out of membrane device positioned on respective sides of the membrane module. Next {108}, manifolds may be attached to each of the four faces of the assembled membrane module to form the working membrane device. Manifolds distribute fluids evenly and uniformly into feed slots (or sweep gas slots) on inlet sides of the membrane device and accumulate fluids evenly and uniformly from feed slots and permeate slots on the outlet sides of the membrane device. {END}. Fabrication of membrane cassettes may be standardized and readily automated for commercial production.

Figure 2A:
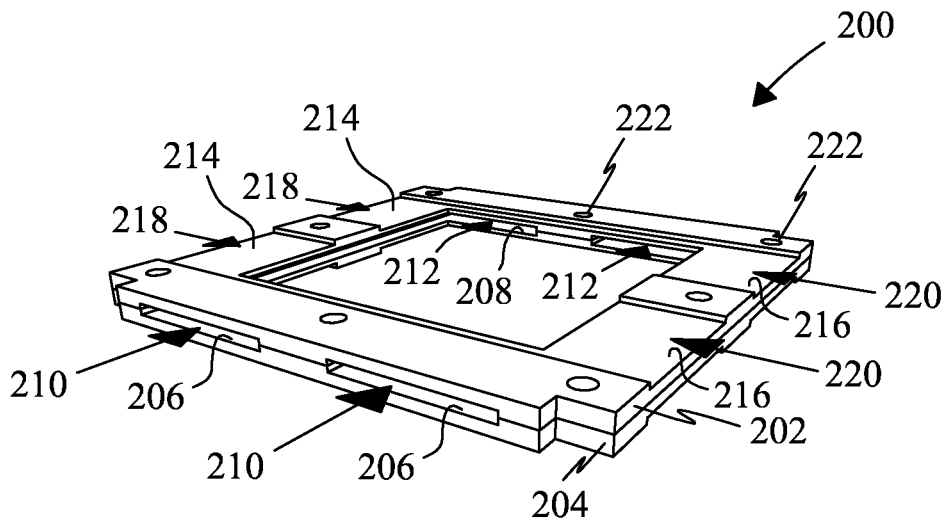
FIG. 2A shows top and bottom half portions of a support frame for assembling a membrane cassette of the present invention.

FIG. 2A shows a perspective view of a support (or mounting) frame 200 used to construct a membrane cassette (FIG. 2B), a basic unit of the membrane device (FIG. 6) of the present invention. Support frame 200 may be constructed of structurally rigid materials including corrosion-resistant metals, metal alloys (e.g., stainless steel, aluminum alloys, or other alloys), ceramics (e.g., alumina, silicon carbide, or other ceramics), and polymers (e.g., polycarbonates, polyesters, polytetrafluoroethylene, or other polymers). In the instant embodiment, support frame 200 may include two symmetric half frames, a top (first) half frame 202 and a bottom (second) half frame 204. Half frames 202 and 204 may include front depressions 206 and rear depressions 208 positioned on respective front and rear faces of half frames 202 and 204, respectively. Half frames 202 and 204 when assembled form front permeate (or sweep) slots 210 and rear permeate (or sweep) slots 212 with selected dimensions that introduce permeate (or sweep) flow streams into and out of the interior of the membrane cassettes. Half frames 202 and 204 further include left side depressions 214 and right side depressions 216 that form left side feed flow slots 218 and right side feed flow slots 220 that introduce and recover feed flow streams from the membrane cassettes, respectively, during operation. Slots may include different non-limiting shapes including, but not limited to, e.g., square, rectangular, or oval.

In some embodiments, slots on any one side of membrane cassette 300 may be in the form of a single opening with larger width and height dimensions. In some embodiments, slots on any one side of membrane cassette 300 may include multiple openings each with smaller width and height dimensions. No limitations are intended. Slots may include typical heights of between about 0.5 mm and about 5.0 mm, but dimensions are not intended to be limited.

Figure 4A:
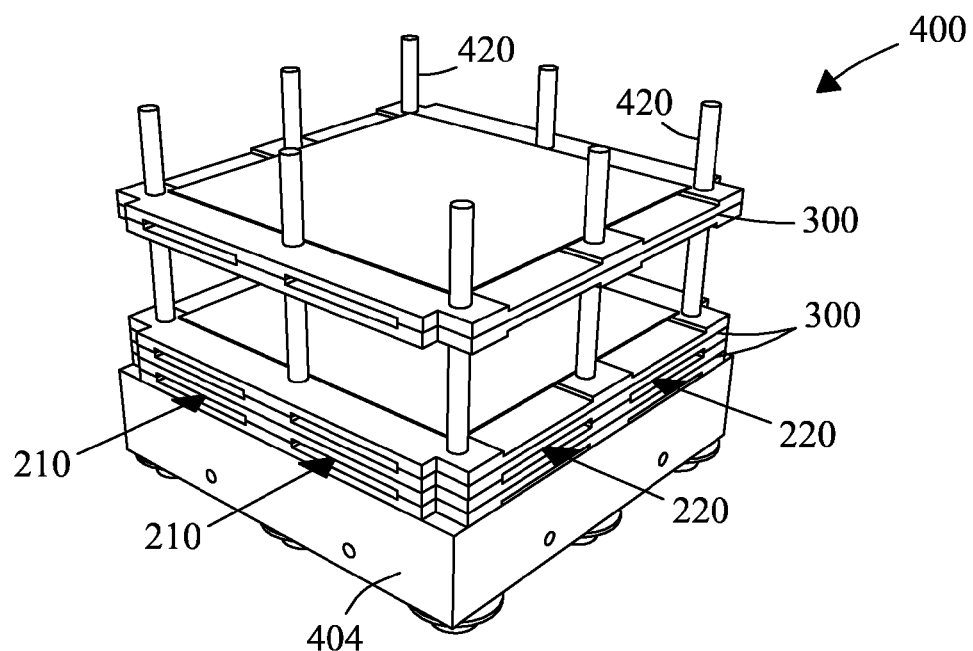
FIGS. 4A-4B show assembly of two different embodiments of a membrane device of the present invention.

Support frame 200 may include mounting holes 222 that allow the frames to be mounted onto mounting posts that align membrane cassettes during assembly, described further in reference to FIG. 4A.

Figure 2B:
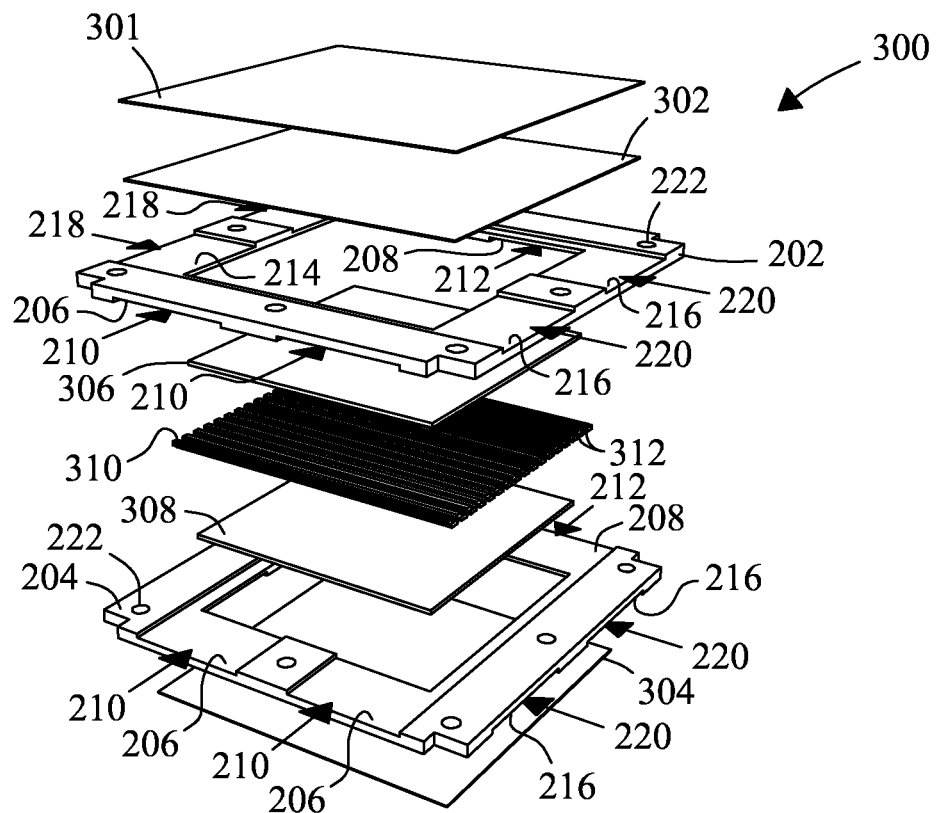
FIG. 2B is an explosion view showing components of a membrane cassette of the present invention.

FIG. 2B is an explosion view of a single membrane cassette 300 that shows internal components. Membrane cassette 300 includes a top porous metal [e.g., nickel (Ni)] membrane 302 that attaches to top half frame 202 of membrane cassette 300 and a bottom porous metal [e.g., nickel (Ni)] membrane 304 that attaches to bottom half frame 204 of membrane cassette 300. Porous metal membranes 302 and 304 may be fabricated as detailed, e.g., by Liu et al. in U.S. Patent Publication No.: US20110155662 entitled "Thin, Porous Metal Sheets and Methods for Making the Same", which reference is incorporated herein in its entirety. Porous metal sheet membranes 302 and 304 may be bonded to respective half frames 202 and 204 with an adhesive, e.g., room temperature vulcanizing (RTV) silicone adhesive. Distance between the two membrane surfaces (termed space height) in each membrane cassette is preferably less than 2.0 mm.

Half frames 202 and 204 may each include at least one front depression 206 and at least one rear depression 208 of a selected depth machined on a single side of half frames 202 and 204. Half frames 202 and 204 may further include at least one depression 214 and at least one depression 216 of a selected depth machined on a left edge and a right edge, respectively, of half frames 202 and 204. Depressions 206 and 208 are oriented 90 degrees from depressions 214 and 216. When half frames 202 and 204 are coupled together, depressions 206 and 208 form permeate (or sweep) flow slots described further herein. Depressions 214 and 216 form feed flow slots described further herein.

Thicknesses of metal membranes 302 and 304 are selected that reduce mass-transport resistance across membranes 302 and 304. Transport rate across the membranes has an inverse first-order dependence on the membrane thickness. Thickness may also be selected to minimize material usage and weight during fabrication. In various embodiments, porous metal sheet membranes 302 and 304 may have a thickness selected between about 20 μm and about 200 μm. A typical thickness is about 50 μm.

Porous metal membranes are mechanically strong and provide a sufficient strength, rigidity, and/or ductility when packaged into the working membrane device to maintain integrity while under pressure gradients and to address mass transport/exchange requirements for flow streams introduced into the working membrane device during operation.

In some embodiments, porous metal membranes may be symmetric membranes with pores that have a uniform dimension throughout the thickness of the membranes.

In some embodiments, porous metal membranes may be asymmetric membranes with pores that include different dimensions or dimensions that otherwise vary through the thickness of the membranes. In some embodiments, the asymmetric membranes may include pores selected in the range from about the range from 0.010 μm to 10 μm. In some embodiments, asymmetric membranes may include a molecular-separation layer 301 deposited atop the membranes. The molecular-separation layer may include pores with a size less than about 1 nm. In an exemplary embodiment, the molecular-separation layer may be comprised of a zeolite with a thickness of less than about 5 μm that is formed on a 50 μm-thick asymmetrical porous Ni sheet membrane, e.g., as detailed by Liu et al. in U.S. Patent Publication No.: US20100304953, which reference is incorporated herein in its entirety.

Metal membranes 302 and 304 in membrane cassette 300 may be supported on backing materials 306 and 308, respectively. Backing materials may be constructed of materials including, but not limited to, e.g., polymers, metals, ceramics, and combination of these various materials. Backing materials may be in the form of sheets, foams, netted screens, or other suitable forms. In some embodiments, backing materials may include a multiple layer structure, each layer including one or more selected materials that allow mechanical properties to be tailored including, e.g., mechanical strength, permeability, and stability during operation. Mechanical strength may be tested by applying selected loads to observe deformation as a function of time and load. Multiple layer structures further allow for various flow channel configurations.

In the figure, a three-layer structure is illustrated. Top metal membrane 302 and bottom metal membrane 304 may each include a respective backing material 306 and 308 in the form of a sheet placed on the rear (back) surfaces of each of the porous metal (Ni) sheet membranes at the top and bottom of support frame 200 in the interior of membrane cassette 300. Backing materials may be sized to fit into support frame 200 of membrane cassette 300.

In the instant embodiment, backing materials may be constructed of porous polyester with an array of ribs overlaid with an array of strands in a 90-degree orientation (e.g., Hornwood Style 1414 polyester sheets). Ribs may be stitched to the strands to provide an overall thickness of about 0.5 mm. Ribs may be about 0.565 mm wide and spaced at an interval of about 0.452 mm. Strands may include a diameter of about 0.135 mm.

Backing materials 306 and 308 may include a selected porosity (void fraction) in the range from about 20% to about 70%. Pore openings in porous backing materials may include a size between about 0.01 mm and about 1.0 mm that permit the permeate to flow out of membrane cassettes 300 with minimal pressure drops. In some embodiments, overall porosity or the open frontal area fraction of the porous polyester backing material may be about 0.23 with a pore size (i.e., hydraulic diameter) of about 0.33 mm.

In various embodiments, backing materials provide a hydraulic diameter of between about 0.3 mm and about 5.0 mm that allows sweep flow streams to pass through the metal membranes.

Backing materials may include a selected thickness. Thickness may be between about 0.020 mm (20 μm) and about 5.0 mm (500 μm). An exemplary thickness is about 0.5 mm (50 μm). In some embodiments, thickness may match the thickness of membrane cassettes 300.

Membrane cassettes 300 may further include a channeled spacing material (or internal spacer) 310 positioned between backing materials 306 and 308 in the interior of the membrane cassette. Channeled spacing material 310 may include or be constructed of aluminum, metal alloys (e.g., nickel alloys, steels), durable polymeric materials, or other like materials. Spacing materials serve to maintain a selected separation distance between the porous metal membranes in the membrane cassettes of the membrane module. In various embodiments, separation distance between the porous metal membranes is between about 0.5 mm and about 10.0 mm. Smaller separation distances are preferred when pressure inside the membrane cassette is comparable to the pressure outside the membrane cassette and/or when distance required to move permeate from the membrane cassette is relatively short due to a smaller size of the membrane cassette. Larger separation distances are preferred when pressure inside the membrane cassette is low or under vacuum and/or when distance required to move permeate from the membrane cassette is relatively long due to a larger size of the membrane cassette.

In various embodiments, channeled spacing material 310 may be in the form of a corrugated (waved) aluminum plate or a corrugated metal mesh. Corrugated (waved) aluminum plates may be fabricated by pressing a flat plate with a wave-like pattern. Spacing material 310 may include straight, open flow channels 312 with selected dimensions. The aluminum plate may include rounded edges to prevent piercing of top and bottom membrane sheets 302 and 304. The corrugated aluminum plate may include a metal sheet thickness of 0.108 mm, a peak-to-trough distance of 0.62 mm. Bended corners may include a radius of about 0.2 mm. Peak-to-peak height may be about 1.04 mm, which results in an open frontal area fraction of 0.78 and a hydraulic diameter of 1.0 mm.

Channeled backing materials 310 are mechanically strong. When used, mass transport from the bulk flow stream may occur only on top metal membrane 302 of membrane cassette 300 as the dense metal can block mass transport across the metal plate. Thus, in the instant embodiment, mass transfer from top membrane 302 may only occur in channels 312 facing top membrane 302. In addition, mass transport from bottom membrane 304 may occur only in channels (not shown) facing bottom membrane 304. This configuration increases transport distance from the bulk flow stream onto the membrane surfaces.

In another embodiment, channeled backing material 310 may be in the form of corrugated (waved) and conjugated metal meshes such as expanded nickel (Ni) mesh (e.g., model 5Ni7-077C metal mesh, Dexmet Corp., Wallingford, Conn., USA). Flow channels 312 of corrugated metal mesh 310 allow mass transfer from the bulk flow stream to both membranes 302 and 304 in membrane cassette 300. Corrugated metal mesh 310 may include diamond-shape openings with a width dimension of about 0.4 mm and a height dimension of about 1.23 mm. Metal wire thickness may be about 0.23 mm. The corrugated metal mesh may have a peak-to-peak height of about 0.99 mm, a peak-to-trough distance of about 1.36 mm, and a bend radius of about 0.31 mm. Channeled backing material 310 may have an overall void fraction of about 78% and a hydraulic diameter of about 1.0 mm. However, no limitations are intended.

In some embodiments, backing materials 306 and 308 may include a single layer structure, e.g., in the form of a plate machined to include flow channels on both front and rear surfaces of the plate. In other embodiments, backing materials may include a 3-dimensional structure, e.g., in the form of a porous plate that includes 3-dimensional flow structures, or screen-like supporting grids, or like structures.

Backing materials 306 and 308 when attached to porous metal membranes 302 and 304 enable the metal membranes to maintain mechanical integrity when pressure gradients of about 1 bar or greater are positioned between the feed side of the membranes and the permeate side of the membranes. Backing materials further provide for rapid transport of sweep flow streams through the metal membranes in the membrane cassette by minimizing flow resistance in a direction parallel to the membrane surfaces. Flow resistance may be characterized by permeance values (P) determined from Equation [1]:

$$P = \frac{F}{SA_M \cdot \Delta p} \qquad [1]$$

Here, (F) is the permeation flow rate; $(SA)_M$ is the membrane area; and $\Delta p$ is the difference in pressure (i.e., pressure drop). For liquid-phase filtration or separation applications, backing materials may include a permeance (P) value preferably greater than about 50 liters/hr/m²/bar. For gas-phase filtration or separation applications, backing materials may include a permeance (P) value preferably greater than about $1.0E-05$ mol/m$^2$/s/Pa.

Pressure drops for gas-phase sweep flow streams are preferably less than about 0.1 bar. For low-pressure operation, pressure drops for gas-phase sweep flow streams are preferably less than about 0.01 bar. For liquid-phase sweep flow streams, pressure drops are preferably less than about 1 bar.

Porous backing sheets 306 and 308 may have a smaller pore size and a lower porosity than the channeled backing material 310 in the middle of the membrane cassette 300 to provide a smooth surface that supports the top and bottom membrane sheets 302 and 304.

Components of membrane cassette 300 may be bonded to support frame 200 with an adhesive such as room temperature vulcanizing (RTV) silicone adhesive. For example, porous backing materials 306 and 308 may be secured to channeled backing material 310. Channeled backing material 310 may then be secured to support frame 200 to reinforce membrane cassette 300. Assembled components may be cured under a weight-bearing load to ensure strong adhesion is achieved between channeled backing materials 310, porous backing materials 306 and 308, metal membranes 302 and 304, and assembled components to support frame 200, which forms the integrated membrane cassette 300.

Fabrication and assembly are flexible permitting various membrane materials, backing materials, and spacing materials to be selected which configure the membrane cassettes for various and specific applications. For example, in some embodiments, membrane cassettes may include zeolite membranes detailed, e.g., in U.S. Patent Publication No.: 20100304953 incorporated herein in its entirety. Zeolite membranes may be attached to one or more of the porous metal membranes of the membrane cassettes. The zeolite layer may include a water-selective zeolite, a hydrocarbon-selective zeolite, or an alcohol-selective zeolite. Exemplary water-selective zeolites include, but are not limited to 3A, 4A, and 5A-type zeolite frameworks. Exemplary hydrocarbon-selective and alcohol-selective zeolites include, but are not limited to, pure silicalite, titanium silicate, and ZSM-5-type and Y-type zeolite frameworks. In some embodiments, the water-selective zeolite membranes may form water-selective molecular sieves that can remove water molecules from a feed stream such as humid air or water/alcohol mixtures when the feed stream is introduced into the membranes cassettes under a pressure gradient. The combined membranes yield a permeate stream with the water removed.

Figure 3:
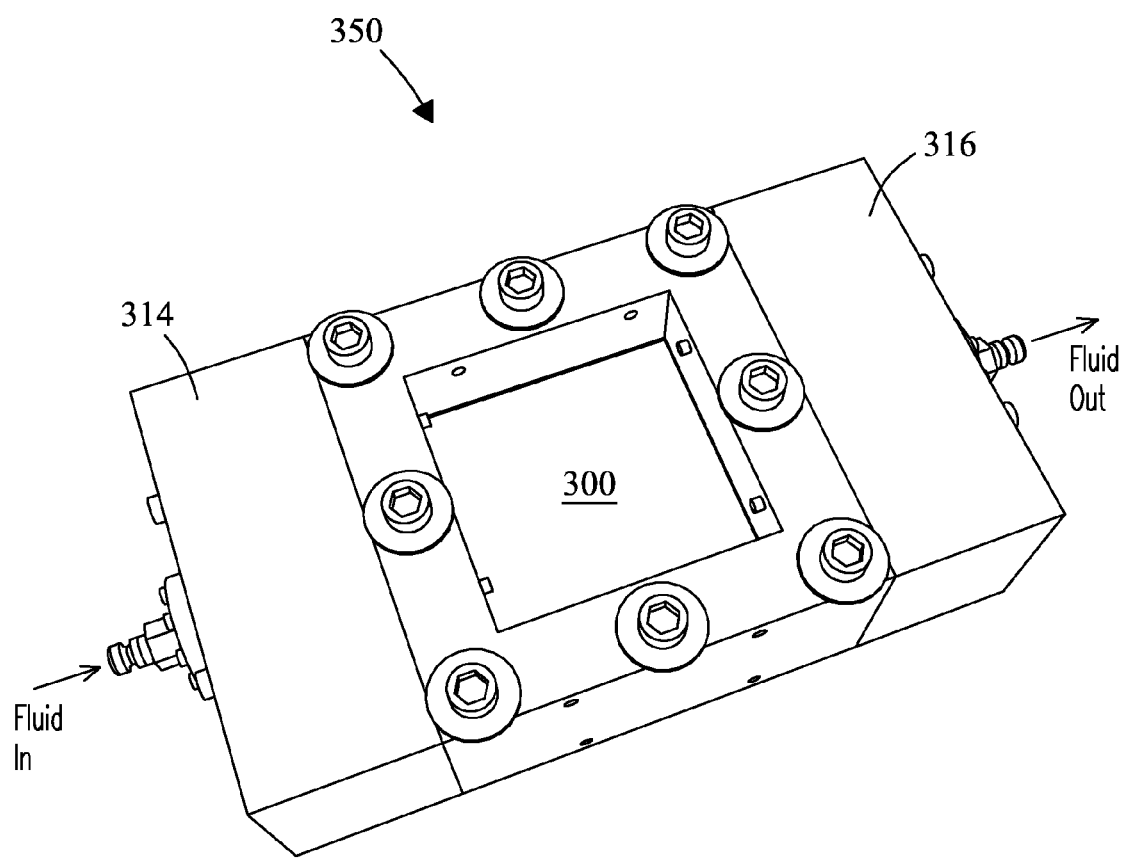
FIG. 3 shows a leak test assembly for testing single assembled membrane cassettes.

FIG. 3 shows a leak test assembly 350 that tests individual assembled membrane cassettes 300 for leaks. In the figure, manifolds 314 (e.g., left feed manifold) and 316 (e.g., right feed manifold) may be coupled to respective sides of membrane cassette 300. Gas may be introduced through manifold 314 through feed slots (not shown) positioned on one side of membrane cassette 300. Gas may be collected through second manifold 316 from feed channels (not shown) positioned on the opposite side of membrane cassette 300. If membrane cassette is properly sealed and cured during assembly, volume of gas introduced into the membrane cassette may be comparable to the volume of gas collected (i.e., exiting) from the membrane cassette.

FIG. 4A illustrates the assembly of a membrane module 400 of the present invention. In the figure, the membrane module may include one or more membrane cassettes 300 that are assembled in a stack of membrane cassettes. In some embodiments, the membrane module may include between 4 and 10 membrane cassettes. In some embodiments, the membrane module may include 10 or more membrane cassettes. However, number of membrane cassettes is not limited. In the instant embodiment, spacers (not shown) described hereafter are not placed between individual membrane cassettes.

In the instant embodiment, membrane module 400 may include mounting posts (e.g., bolts) 420 that allow membrane cassettes 300 to be aligned during assembly. Mounting posts may be eliminated if alignment of membrane cassettes is provided with an external alignment device. No limitations are intended.

Figure 5:
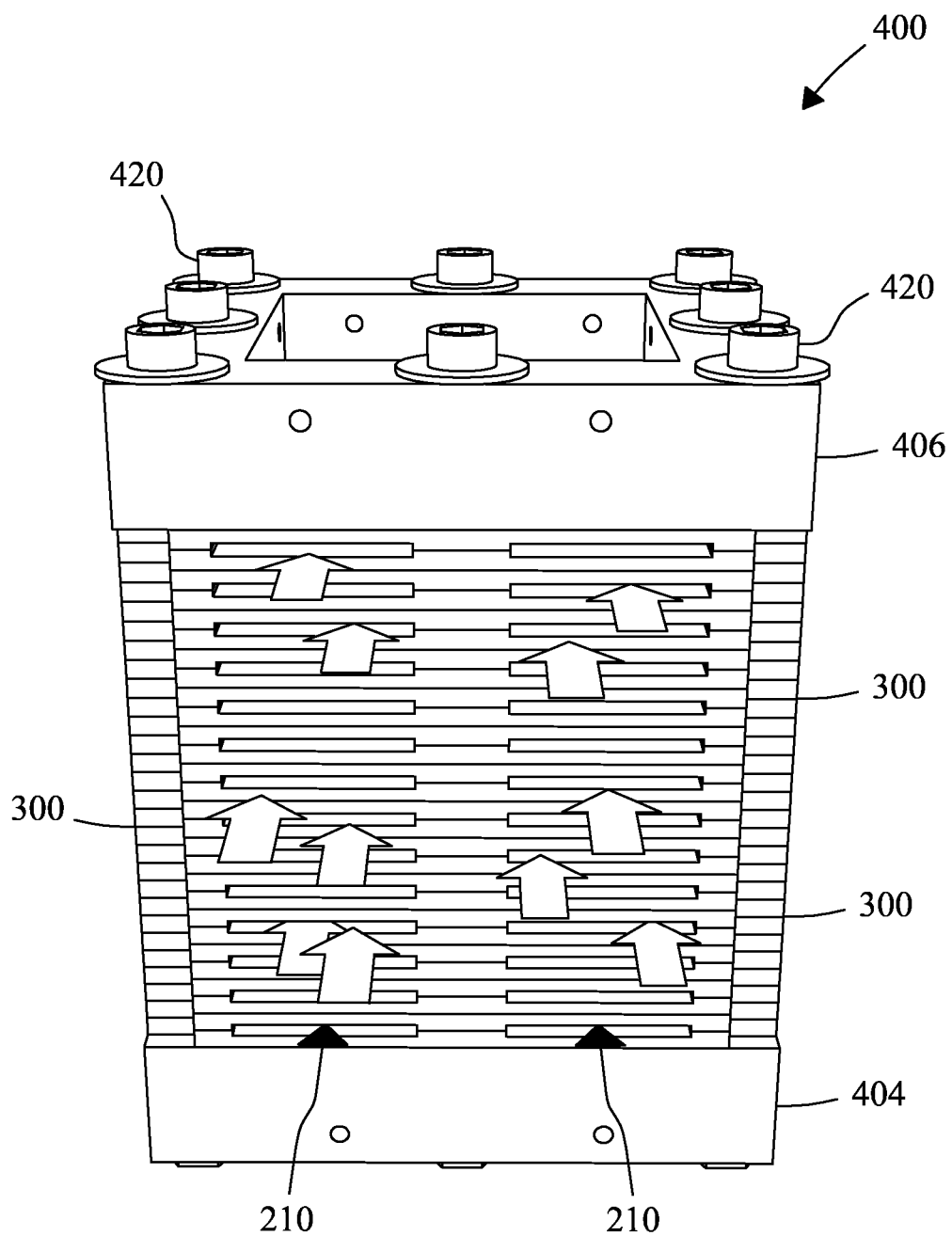
FIG. 5 shows flow slots in an assembled membrane module of the membrane device of the present invention.

Membrane module 400 may further include a bottom (base) cover plate 404, and a top cover plate (not shown) described further in reference to FIG. 5. Cover plates may be constructed of dense materials including metals, metal alloys, or plastics. Cover plates may be placed at the base and the top of the stack of membrane cassettes to support and align the membrane cassettes. Flow channels (not shown) may be machined onto the internal faces of the base cover plate and the top cover plate between a bottom membrane cassette and a top membrane cassette, respectively, so that no dead volumes exist in the membrane module. The stack of membrane cassettes 300 forms flow slots on respective sides of the membrane module including, e.g., front and rear permeate feed slots and left and right side feed slots. In the figure, front permeate slots 210 and right side feed slots 220 are shown.

Adhesive (e.g., 732 RTV, Dow Corning Corp., Midland, Mich., USA) may be applied to contacting edges (not shown) on front and rear faces of support frames (FIG. 2A) of membrane cassettes 300 to bond the membrane cassettes together in the stack of cassettes. In the instant embodiment, left and right sides of membrane cassettes 300 do not include contacting edges in order to provide openings that permit feed flow streams to be introduced from the left side or the right side of the membrane cassettes, or vice versa. Bottom cover plate 404 and top cover plate may be bonded to the stack of membrane cassettes with the RTV adhesive or by welding. No limitations are intended. The assembled stack of membrane cassettes may be placed under a weight load sufficient to keep all membrane cassettes and the bottom and top cover plates in contact for a time sufficient to cure the RTV adhesive and bond the membranes cassettes and the cover plates together. An integrated membrane module is obtained. Curing time can vary from a few hours to a few days. Curing temperatures may be varied from room temperature to about 300° C.

Figure 4B:
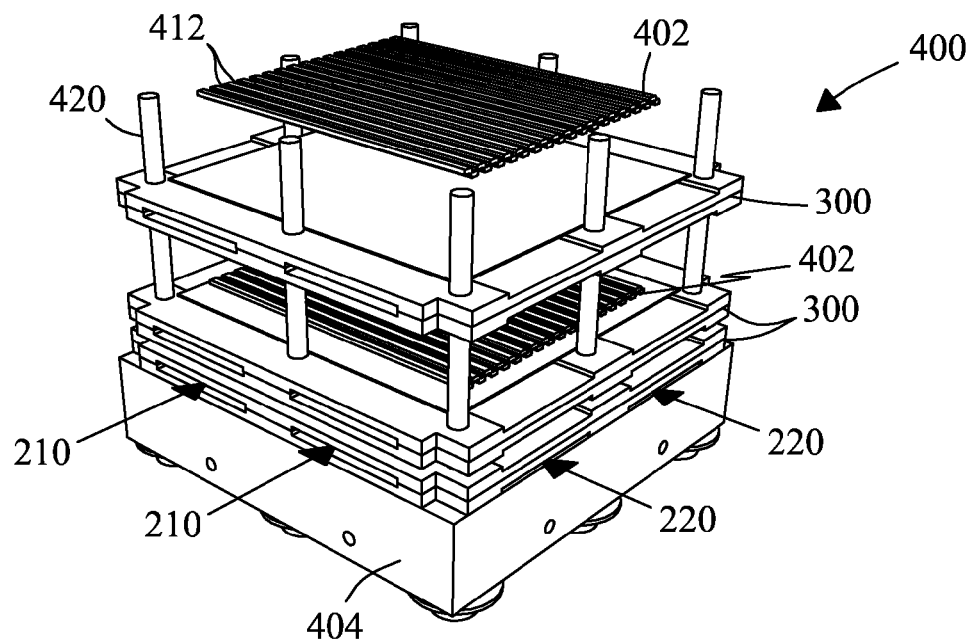

FIG. 4B shows an assembly of an alternate configuration for membrane module 400 for applications such as filtration/separation. Additional support structures in the membrane module prevent bowing of membrane sheets (FIG. 2B) when pressure gradients are applied. Membrane module 400 may include one or more membrane cassettes 300 that form a stack of assembled membrane cassettes. Number of membrane cassettes is not limited. In the figure, mounting posts (e.g., bolts) 420 may be used to align membrane cassettes 300 during assembly.

The stack of membrane cassettes 300 forms flow slots on respective sides of the membrane module including, e.g., front and rear permeate feed slots and left and right side feed slots. In the figure, front permeate slots 210 and right side feed slots 220 are shown.

Membrane module 400 may include a bottom or base cover plate 404, and a top cover plate (not shown), as described previously in reference to FIG. 4A. Cover plates may be placed at the base and the top of the stack of membrane cassettes to support and align the membrane cassettes. Flow channels (not shown) may be machined onto the internal faces of the base cover plate and the top cover plate between the bottom membrane cassette and the top membrane cassette to eliminate dead volumes in the membrane module.

In the instant embodiment, a channeled spacing material (spacer) 402 may be positioned between adjacent membrane cassettes 300 in the stack of cassettes. Spacers may also be placed between bottom cover plate 404 and a membrane cassette 300 positioned at the bottom of the stack of cassettes, and between the top cover plate (not shown) and a membrane cassette positioned at the top of the stack of cassettes. Channeled spacing material 402 may consist of one or multiple structural elements. In some embodiments, channeled spacing materials (spacers) may include a single structural element, e.g., in the form of corrugated metal plates or metal sheets with flow channels 412 on either a single side or on both front and rear surfaces of the plate, conjugated screens, corrugated (waved) conjugated metal meshes, or other suitable materials. In some embodiments, channeled spacing materials may include multiple structural elements. Single structural element spacers are preferred as they simplify assembly. Channeled spacing materials prevent bowing or bending of membrane sheets in the membrane module when reverse-pressure gradients are applied, e.g., when the feed channel pressure is less than the permeate channel pressure. Channeled spacing materials also create open flow channels 412 with selected dimensions for feed flow streams to pass through membranes of the membrane cassettes with a minimal pressure drop while simultaneously allowing rapid mass transfer from the bulk flow onto membrane surfaces. Pressure drops for low-pressure gas streams at or near atmospheric pressure is preferably less than about 0.01 bar. Pressure drops for high-pressure gas flow streams or liquid flow streams above atmospheric pressure are preferably less than about 0.1 bar. Channeled spacing materials may include a hydraulic diameter preferably between about 0.3 mm and about 4.0 mm.

FIG. 5 illustrates a fully assembled membrane module 400 of the present invention, assembled as described previously in reference to FIG. 4A or FIG. 4B. Membrane module 400 when assembled includes flow slots positioned on respective sides of the membrane module including, e.g., front and rear permeate slots and left and right side feed slots. In the figure, slots on one side of the membrane module are shown, which may be representative of permeate slots or feed slots. In the figure, bottom (base) cover plate 404 and top cover plate 406 are shown described previously in reference to FIG. 4A or FIG. 4B. Mounting posts (e.g., bolts) 420 maintain alignment in the assembled membrane module.

Feed slots serve to introduce a feed flow stream into flow channels in the membrane module or retrieve a processed feed flow stream from the membrane module. By selection of suitable spacing materials, feed channels may have selected shapes, geometries, and size dimensions including height and width. In various embodiments, feed channels may have a height selected in the range from about 0.3 mm to about 5 mm. In some embodiments, a single feed channel with a larger width may be used. In some embodiments, a number of feed channels may be used that each may include a smaller width. No limitations are intended. Feed channels may be evenly distributed along the width of the membrane sheet facing the feed flow stream.

Permeate slots serve to retrieve a permeate flow stream from flow channels in the membrane module following separation or filtration. Permeate (or sweep) channels (not shown) internal to the membrane module are oriented in a direction 90 degrees relative to the feed flow channels. By selection of suitable backing materials, permeate channels may have selected shapes, geometries, and size dimensions including, e.g., height and width. In various embodiments, permeate channels may have a height selected in the range from about 0.3 mm to about 5 mm. In some embodiments, a single permeate slot with a larger width may be used. In some embodiments, a number of permeate channels may be used each with a smaller width. No limitations are intended. Permeate channels may be evenly distributed along the width of the membrane cassettes facing the feed flow.

Figure 6:
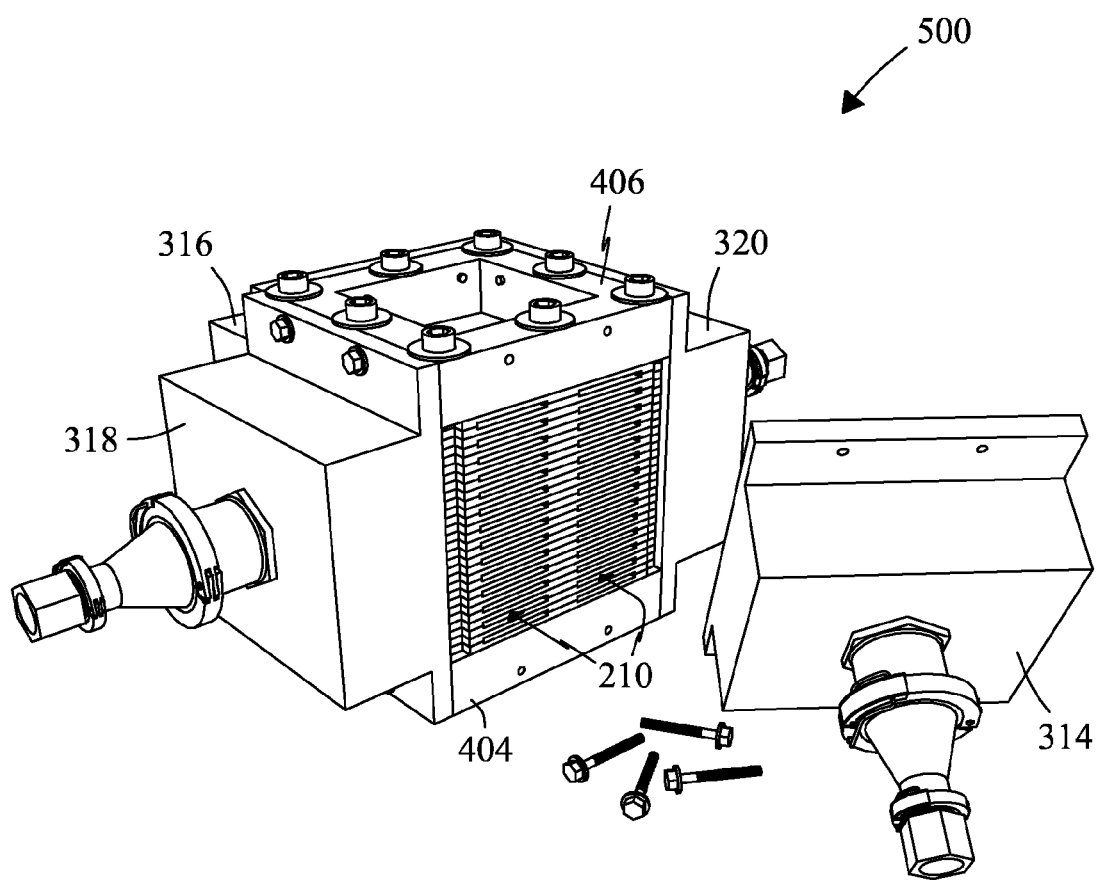
FIG. 6 shows manifolds that attach to an assembled membrane module that form a working membrane device of the present invention.

FIG. 6 shows a working membrane device 500 of the present invention. Membrane device 500 includes the assembled membrane module 400 comprised of the stack of membrane cassettes with the bottom cover plate 404 and top cover plate 406 in position, as described previously in reference to FIG. 5. Membrane device 500 includes manifolds 314, 316, 318, and 320 that attach to respective (i.e., four) faces of membrane module 400 to form the working membrane device 500. Manifolds of the present invention are chambers or vessels used to introduce flow streams into, or collect flow streams from, flow slots located on respective sides of membrane device 500. In the figure, permeate manifolds 318 and 320 are attached to permeate slots (not shown) on opposite sides of assembled membrane module 400. Permeate manifold 318 may be configured to introduce a single sweep flow stream uniformly into multiple permeate (or sweep) flow slots (not shown) on one side of membrane module 400, or to collect permeate exiting from one side of the membrane module. Permeate manifold 320 may be attached to permeate flow slots on the opposite side of the membrane module to collect sweep flow streams exiting from permeation slots, or to collect permeate flow streams exiting from permeation slots on that side of the membrane module. In the figure, feed slots 210 are shown exposed on the feed side of membrane module 400. Feed manifold 314 is configured to introduce a feed flow stream uniformly through feed slots 210 into membrane module 400. Feed manifold 316 is shown attached to the membrane module for collection of the feed flow stream after processing.

Figure 7A:
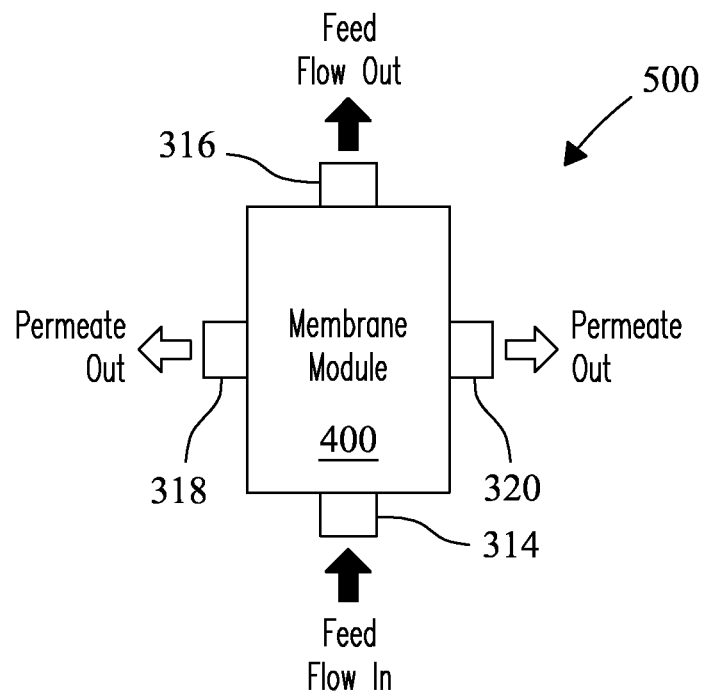
FIGS. 7A-7B show exemplary operation modes of the membrane device of the present invention.

Membrane device 500 may be operated in various flow modes that provide operational flexibility for different applications. Flow modes include, but are not limited to, e.g., cross-flow, counter-current flow, co-current flow, and mixed flow. FIG. 7A shows a cross-flow mode of operation for separation and/or filtration applications. In this configuration, a spacer (FIG. 4B) between membrane cassettes (not shown) in the membrane device is optional as pressure on the feed side of the membrane device may be greater than the pressure on the permeate side of membrane device. In this mode of operation, a feed (inlet) stream may be introduced through a first feed manifold 314 into membrane module 400 that contains the assembled stack of membrane cassettes (described in reference to FIG. 4A). The feed stream passes uniformly in one direction over the membrane surfaces (not shown) internal to the membrane module, and subsequently discharges through a second (e.g., rear) manifold 316 attached on an opposite side of membrane module 400, as shown. A permeate (outlet) stream may be collected from the membrane module through a third manifold 318 and a fourth manifold 320 oriented 90 degrees from the feed manifolds on opposite sides of the membrane module. Permeate may be collected from two sides of the membrane module to reduce transport resistance. If transport resistance is insignificant, permeate may be withdrawn from a single side of the membrane module.

In some embodiments, membrane device 500 may be configured for separation and/or filtration applications. In this mode, a particulate-laden feed introduced to membrane device 500 may be filtered by maintaining a higher pressure on the feed side of the membrane device than on the permeate side of the membrane device such that the fluid in the feed stream permeates through the membranes and delivers a clear fluid into the permeate stream exiting from the membrane device, while particulates in the feed stream may be blocked by the membranes. In this application, a spacing material may be used in the membrane module in the membrane cassette stack (FIG. 4B) to enable back-flushing of the membrane surfaces.

In another application such as air dehumidification, humid air may be introduced as a feed stream into the membrane device at a pressure selected near atmospheric pressure (e.g., 1 bar). By pulling a vacuum between about 1 mbar and about 300 mbar on the permeate side of the membrane device, water molecules may be removed from the humid air as the feed stream flows over the membranes. In this embodiment, no spacing material is used in order to minimize feed flow resistance.

Figure 7B:
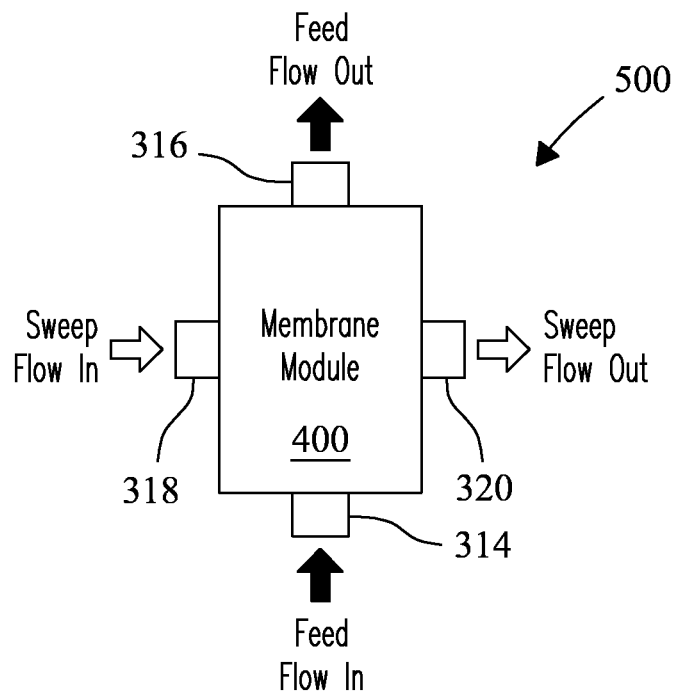

FIG. 7B shows a cross-flow mode of operation for mass-transfer and/or mass-exchange applications. In this mode of operation, pressure on the feed side of membrane device may be comparable to the pressure on the permeate side of membrane device. Thus, membrane device may include a spacer (FIG. 4B) positioned between membrane cassettes (not shown) inside the membrane cassette. A feed (inlet) stream may again be introduced through a first feed manifold 314 into membrane module 400 that contains the assembled stack of membrane cassettes (described previously in reference to FIG. 4B). The feed flow stream passes uniformly in one direction over the membrane surfaces (not shown) internal to membrane module, and subsequently discharges through a second (e.g., rear) manifold 316 positioned at an opposite side of membrane module 400, as shown. In this mode of operation, a sweep (inlet) flow stream may be introduced through a third manifold 318 positioned on another side of membrane module 400. The sweep (inlet) flow stream flows uniformly over the back side of membrane sheets within the membrane module in a direction perpendicular (i.e., cross-wise) to the direction of the feed flow stream. The sweep flow stream travels to the opposite side of the membranes. The sweep flow stream may be collected through a fourth manifold 320.

In some embodiments configured, e.g., for mass and heat transfer operation, pressure on the feed side and the sweep side of the membrane device may be similar but the two flow streams may have different temperatures. For example, for energy recovery in a hot humid climate from building exhausts, hot humid ambient air may be introduced from the feed side of the membrane device, while dry and cool air in the building may be discharged from the sweep side of the membrane device. Feed and sweep flow streams may be introduced at near atmospheric pressure (e.g., 1 bar) such that water molecules in the humid air diffuse across the membranes into the dry air driven by the difference in partial pressures of water vapor between the feed side and the sweep side of the membrane device. Temperature for the hot air may be about 25° C. to about 45° C. and relative humidity (RH) may be about 50% to about 80%, respectively. Temperature for the sweep air may be about 15° C. to about 25° C. and relative humidity (RH) may be about 50% to about 80%, respectively.

In another embodiment configured, e.g., for membrane adsorption, a $CO_2$ gas stream may be introduced from the feed side of the membrane device while a solvent stream may be introduced from the sweep side of the membrane device. In this application, $CO_2$ diffuses from the feed gas across the membranes and absorbs into the solvent stream, such as ionic liquids and amine-based aqueous solutions. The transfer can be driven by the difference in chemical potential for $CO_2$ between the feed side and the permeate side of the membranes.

Applications

The membrane device of the present invention with its thin-sheet porous metal membranes and straight, open flow channels provides a high membrane surface area per unit volume for applications including, e.g., mass-transfer, mass-exchange, heat-exchange, filtration of particulates, and molecular separation. Membrane surface area per unit volume values (i.e., total packed volume excluding inlet and outlet volumes) of the membrane module of the present invention range from about 300 $m^2/m^3$ to about 3500 $m^2/m^3$. Open flow channels enable process streams to pass through the membrane module with low pressure drops. Open flow channels with their controlled channel geometries (e.g., spacing, height, and shape) further minimize transport resistance of bulk flow streams onto the membranes.

In some embodiments, zeolite membranes may be attached to the porous metal membranes in the membrane cassettes of the membrane device for molecular separation applications. Zeolite membranes may be formed by growing zeolite crystals on the porous metal sheet membranes to form a zeolite layer of a selected thickness. In some embodiments, the zeolite layer may include inter-grown zeolite crystals with a thickness less than 10 μm. Varying thicknesses may be employed. Thus, thickness is not intended to be limited.

Zeolite layers are preferred that have a high crystallinity and crystal density that yields a zeolite membrane layer with an absence of voids and/or pinholes. Zeolite crystals have well-defined latticed pore structures that separate individual molecules based on slight differences in size, shape, and/or weight. Zeolite membranes deliver molecules across the zeolite membrane via diffusion through the zeolite crystals providing both a high flux and high selectivity for molecular separation.

In some embodiments, the membrane module may include zeolite membranes in the form of tubes that include a diameter from about 6 mm to about 30 mm. Larger tube diameters increase the mass transport distance from the bulk flow stream onto the membrane surface. For a zeolite membrane module packed with membrane tubes with a dimension of 10 mm I.D.×12 mm O.D. and a membrane tube/module volume fraction of 0.4, the membrane area packing density is 133 $m^2/m^3$, and the mass transport distance from the tube center to the zeolite membrane surface is 5 mm. By comparison, a flat sheet membrane module of the present invention configured with feed channels having a height dimension of 1 mm, a membrane sheet thickness of 0.05 mm, and a permeate channel height of 2.0 mm, the membrane area packing density is about 660 $m^2/m^3$. Mass transport distance from the center of the feed channel to the membrane surface is about 0.5 mm. Membrane area packing density is substantially enhanced and mass transport distance is substantially reduced.

In some embodiments, the membrane device may be configured for dehumidification of air in hot and humid climate in buildings and in vehicles; to remove moisture from a gas stream; to remove moisture from a gas stream to produce potable water from air and combustion exhaust gas streams; and for drying water-miscible solvents such as ethanol/water or alcohol/water. In such applications, a water-selective thin-sheet zeolite membrane may be used in the construction of the membrane cassettes that may be assembled in the membrane device. The present invention decreases energy consumption, and provides an enhanced productivity. As an example, a water-containing feed stream may be introduced to the membrane device at atmospheric or low pressures between about 1 bar and about 10 bar, while the permeate side of the membrane device is maintained at a reduced pressure or under vacuum between about 1 mbar to about 300 mbar. As the feed stream flows through the membrane device, water molecules may be selectively adsorbed onto the zeolite membrane surface, adsorbed water molecules may then diffuse across the membrane, and permeated water vapor may be collected on the permeate side of each membrane cassette and the collected permeate stream may be discharged through permeation slots from the membrane device. Thus, dehumidification or dehydration can be continuous, without changes in feed stream temperature and/or pressures. Membrane dehydration of the present invention for separation of ethanol and water can reduce energy consumption by more than 50% compared to conventional distillation, because distillation requires constant vaporization and condensation due to temperature gradients along the entire height of the distillation column.

Similarly, membrane dehumidification of the present invention for adsorption/absorption can reduce energy consumption by more than 50% compared to conventional air dehumidification because conventional adsorption/absorption requires periodic regeneration of saturated desiccating materials that requires large quantities of thermal energy to heat the desiccating materials. In both examples, the membrane device includes a size that is smaller than the conventional equipment for distillation or adsorption by at least one order of magnitude.

In various embodiments, membrane device may be configured with water-selective molecular sieve membranes (i.e., positioned atop metal sheet membranes) that provides continuous removal of water vapor through a highly $H_2O$-selective and permeable membrane. No regeneration is required; no environmental emissions.

In some embodiments, the membrane device of the present invention may be configured for operation as a separation or filtration device, e.g., by connecting feed and permeate flow streams to respective feed and permeate sides of the membrane module.

In some embodiments, porous metal membranes permit filtration of particulates from various process streams including, e.g., filtering microalgae from algae culture solutions to harvest the microalgae. In various embodiments, the membrane device when configured with filtration membranes comprised of thin porous metal sheets described herein may have pores with sizes between about 0.1 µm and about 2.0 µm. For filtration applications, porous metal sheets may be modified to include selected coatings with pore sizes that range from about 1 nm to about 100 nm.

In some embodiments, the membrane device may be configured for filtering aerosol particulates from air.

In some embodiments, the membrane device may be configured to provide molecular separation or filtration in concert with a pressure gradient positioned between the feed side and the permeate side of the membrane device.

For applications that are not sensitive to pressure drops such as dehydration of a pressured gas or filtration of a pressured liquid, feed flow channels and/or permeate flow channels with a size between about 0.3 mm and about 1.0 mm may be employed to maximize the area and packing density of the membranes to enhance the strength of the membranes such that they maintain integrity under large pressure gradients across the membranes. In some embodiments, flow channels may have a hydraulic diameter that is about 1.0 mm or less. Hydraulic diameter (d) is given by Equation [2] hereafter:

$$d = 4 \cdot S L \qquad [2]$$

Here, (S) is the cross-sectional area for a flow to pass, and (L) is the perimeter of the channel exposed to the flow stream. For a square channel of width (w), $S=w^2$, $L=4w$, and the hydraulic diameter $d=w$.

For applications that are sensitive to pressure drops such as dehumidification of air at atmospheric pressure, size of the flow channels may be selected to minimize the pressure drop. In some embodiments, feed channels and permeate channels in the membrane device are preferably straight flow channels in order to minimize dead volumes and pressure drops.

EXAMPLES

The following examples provide a further understanding of various aspects of the present invention.

Example 1

Filtration Application

The membrane module of FIG. 7A was used. A cross-flow membrane module was constructed and configured for filtration and harvesting of algae. Design parameters for the membrane module are listed in TABLE 1.

TABLE 1 lists dimensions and components of a typical cross-flow membrane module for filtration applications.

| Membrane sheet dimension | |
| --- | --- |
| Width | 13.1 cm |
| Length | 13.1 cm |
| Membrane sheet exposed to humid air | |
| Width | 12.00 cm |
| Length | 12.00 cm |
| Number of membrane sheets | 18 |
| Number of membrane cassettes | 9 |
| Feed side (membrane coating) | |
| Channel height | 0.10 cm |
| Number of feed slots | 10 |
| Permeate side | |
| polyester backing (0.5 mm) thickness | 0.10 cm |
| Open channel height | 0.10 cm |
| Number of permeate slots | 9 |
| Calculation | |
| Total membrane area | 2592 cm$^2$ |
| Cross-sectional area for feed flow | 12.0 cm$^2$ |
| Hydraulic diameter of feed channel | 0.10 cm |
| Volume of feed channels | 144 cm$^3$ |
| Cross-sectional area for permeate flow | 10.8 cm$^2$ |
| Hydraulic diameter of permeate flow | 0.10 cm |
| Volume of permeate channels | 259 cm$^3$ |

Figure 8:
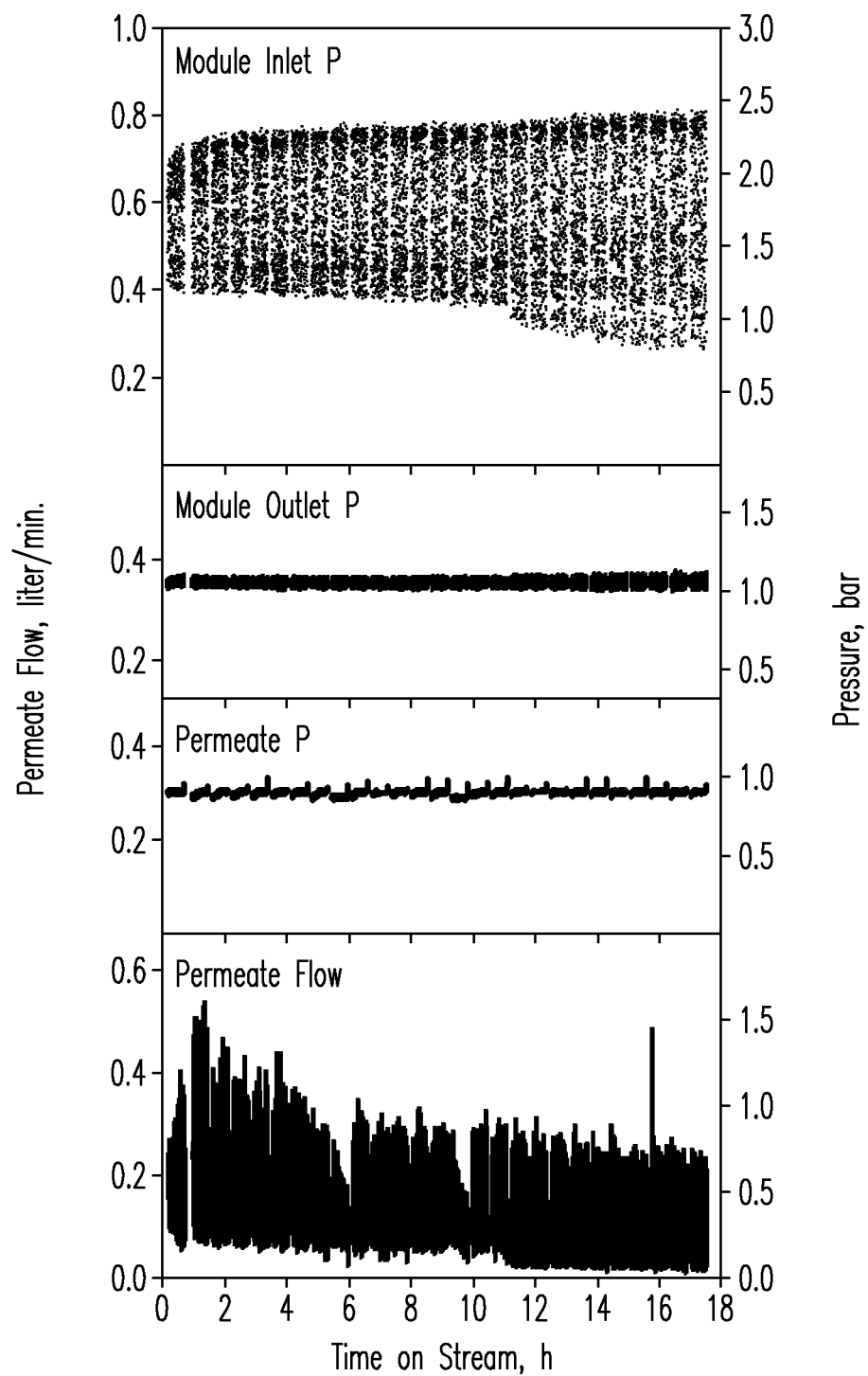
FIG. 8 plots variations in operation parameters of the membrane device in a filtration application as a function of time.

Membrane cassettes were stacked together as described in reference to FIG. 4B. A corrugated (waved) sheet of nickel (Ni) mesh was placed between individual membrane cassettes in the stack, and between membrane cassettes positioned adjacent the top and bottom cover plates. The membrane module included 9 membrane cassettes with 10 feed slots and 9 permeate slots. The waved Ni mesh was used as a spacing material and to support membranes in the membrane cassettes during back-flushing. During normal filtration operation, pressure on the feed side of the membrane device is greater than for the permeate side. Filtrate flows from the feed side to the permeate side. Membrane surfaces can be cleaned by pushing a clean fluid from the permeate side of the device into the feed side of the device (i.e., back-flushing). During back flushing, pressure on the feed side of the device is less than the permeate side. FIG. 8 plots variations in operation parameters during operation of the membrane device in an exemplary filtration application for harvesting algae as a function of time. Applications are not intended to be limited. An untreated algae culture was stored in a storage tank. The algae culture was pumped as a representative feed from the storage tank through the membrane device. Feed stream output from the membrane device was returned to the storage tank. A clear solution was withdrawn from the permeate side of the membrane device under vacuum. The permeate stream collected from the membrane device had a direction of flow perpendicular to the flow of the feed stream through the membrane device. For typical cross-flow filtration operation, velocity of the feed liquid inside the feed channels was run at a low feed rate of about 0.27 m/s. Feed channels of the membrane module were aerated by introducing pulses of air into the feed (inlet) channels of the membrane module to prevent accumulation of caked layers on the membrane surfaces during filtration. As such, inlet pressure of the feed flow stream into the membrane module fluctuated over a wide range, as shown by the top (first) plot in FIG. 8. Feed pressure out of the membrane module was nearly constant at a pressure slightly above atmospheric pressure, as shown by the second plot. Pressure on the permeate side was maintained at about 0.9 bar during filtration, as illustrated in the third plot. As a result of the pressure fluctuation of the feed flow stream at the inlet to the membrane module, pressure of the permeate flow stream fluctuated accordingly due to fluctuation of the pressure gradient across the membrane, as shown in the bottom plot. A permeate storage tank was periodically discharged to the environment by raising the pressure on the permeate side of the membrane module to a pressure above atmospheric pressure every 0.5 hours as shown in the figure. The membrane device had a flux (L/m$^2$/h) about 2 to 3 times greater than the flux measured for a commercial polyvinyl alcohol (PVA) membrane plate designed for wastewater treatment. For this test, feed inlet pressure fluctuation was deliberately introduced into the membrane device performed by introducing air pulses into the feed flow stream. Normal inlet feed pressure is stable without aeration. Post examination of membrane cassettes and membrane sheets after a one-week run showed little or no deposition or accumulation of algae on the membrane surface. Membrane cassettes were also intact. Adsorption of soluble culture polymers inside the membrane pores could gradually reduce flux with time. Thus, periodic cleaning of membrane module membranes is recommended for repeated harvesting runs. Membrane module may be physically cleaned by back flushing, which was shown to be as effective as use of chemical cleaning agents.

Example 2

Membrane Module for Dehumidification

The membrane module of FIG. 7A was used. A cross-flow membrane module was constructed and configured for molecular separation and dehumidification. Design parameters for the membrane module are listed in TABLE 2.

TABLE 2 lists dimensions and components of a typical cross-flow membrane module for air dehumidification applications.

| Membrane sheet used dimension | |
| --- | --- |
| Width | 5.25 cm |
| Length | 11.25 cm |
| Membrane sheet exposed to humid air | |
| Width | 4 cm |
| Length | 10 cm |
| Number of membrane sheet | 6 |
| Number of membrane cassettes | 3 |
| Feed side (membrane coating) | |
| Channel height | 0.1 cm |
| Feed channel spacing | 4 cm |
| Number of feed slots | 4 |
| Permeate side | |
| polyester backing (0.5 mm) thickness | 0.1 cm |
| Open channel height | 0.1 cm |
| Number of permeate slots | 3 |
| Calculation | |
| Total Membrane area | 240 cm$^2$ |
| Cross-sectional area for feed channel | 1.6 cm$^2$ |
| Hydraulic diameter of feed channel | 0.2 cm |
| Volume of feed channels | 16 cm$^3$ |
| Cross-sectional area for permeate vapor | 3 cm$^2$ |
| Hydraulic diameter of permeate flow channel | 0.1 cm |
| Volume of permeate channels | 24 cm$^3$ |

A water-selective zeolite membrane sheet was prepared by growth of a zeolite membrane on the 50 μm-thick porous Ni sheet membranes (for use as zeolite supports). Zeolite membranes included inter-grown zeolite crystals of a selected zeolite (e.g., NaA/Ni) that formed a zeolite layer with a thickness between about 2 μm and about 6 μm. The zeolite membrane layer was sufficiently thin that the zeolite membrane coupled to the porous metal (i.e., Ni) membrane resembled the bare metal membrane.

Three membrane cassettes were assembled as illustrated in FIG. 4A without use of an internal spacing material to form the cross-flow membrane module. For the dehumidification application, spacers were not positioned between membrane cassettes within the feed channel. Membrane cassettes each included a support frame made of polycarbonate. Frame sizes varied from 13.1 cm×13.1 cm down to 5.25 cm×11.25 cm.

The membrane module included an active membrane separation area of 240 cm$^2$. Feed air has a typical travel length of about 10 cm over the membrane surface. Permeate vapor has a typical travel length of about 4 cm below the membrane surface. Parameters were used to calculate hydrodynamic, mass transfer, and heat transfer values.

Figure 9:
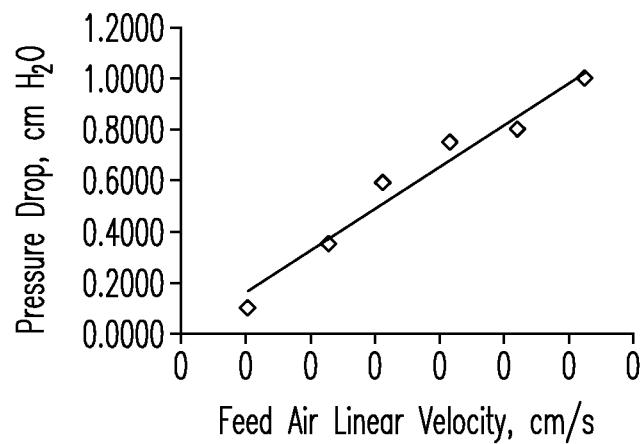
FIG. 9 plots pressure drops measured through the membrane device as a function of feed air linear velocity.

The module was configured with a positive pressure gradient between the feed flow stream and the permeate flow stream. For dehumidification and membrane separation applications, pressure on the feed side of the membrane module is typically greater than on the permeate side. As such, spacing materials are not needed for the feed channels. Without the spacing material, feed air can flow through the feed channels with a lower pressure drop. The membrane module was tested for pressure drops. Pressure drop through the membrane stack was determined by subtracting the pressure drop through the manifolds from the total pressure drop. FIG. 9 plots pressure drop variations measured through the membrane module as a function of feed air linear velocity. In the figure, pressure drop increases with flow velocity. Pressure drop is about 0.65 cm of water at a flow velocity of 200 cm/s.

Mechanical integrity and leak-free operation of the membrane device were tested using vacuum filtration of colored water. The membrane device was free of defects. No color molecules (size ~1 nm to 2 nm) permeated through the membrane. Permeation of water was low after the filtration measurement.

The membrane module was then placed in an oven and tested for dehumidification of air. Humidified in-house air was introduced through the inlet manifold into the membrane device and discharged into ambient air through the outlet manifold. Moisture was pulled from the permeate side of the membrane device with a vacuum pump. Water vapor permeate was collected in a liquid nitrogen trap after exiting from the membrane device. Rate of residual air flow discharged by the vacuum pump was measured with a digital flow meter. TABLE 3 lists mechanical integrity test data collected for air introduced at approximately atmospheric pressure on the feed side of the membrane device. FIGS. 10A-10D show dehumidification results for incoming feed air at two different temperatures.

TABLE 3

Lists data collected from module mechanical integrity tests.

| Feed air linear velocity, m/s | Feed air pressure, kPa | Permeate pressure, KPa | Air leakage rate, cc/min | % of feed air leaked |
|---|---|---|---|---|
| 52 | 105.9 | 4.8 | 125 | 2.49% |
| 115 | 106.1 | 4.8 | 132 | 1.20% |
| 156 | 106.4 | 4.8 | 132 | 0.88% |
| 208 | 106.4 | 4.8 | 133 | 0.66% |
| 260 | 106.9 | 4.8 | 134 | 0.53% |
| 313 | 107.2 | 4.8 | 135 | 0.45% |

Data in the table show that the membrane module maintains mechanical integrity when vacuum is pulled on the permeate side. Air feed is at nearly atmospheric pressure. A small quantity of air may leak through defects in the membranes. Pressure drop measurements show that the pressure drop through the module is about 0.63 cm water at Vg of 1.54 m/s and 0.95 cm water at Vg of 2.1 m/s. Vg is feed air superficial linear velocity though the module.

Figure 10A:
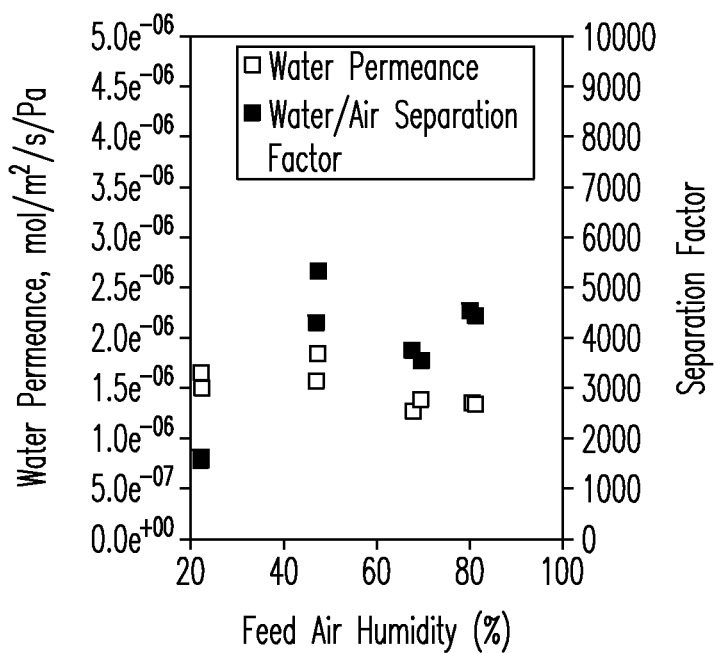
FIGS. 10A-10B show performance of the membrane device for dehumidification of feed air at selected flow rates and temperatures.
Figure 10B:
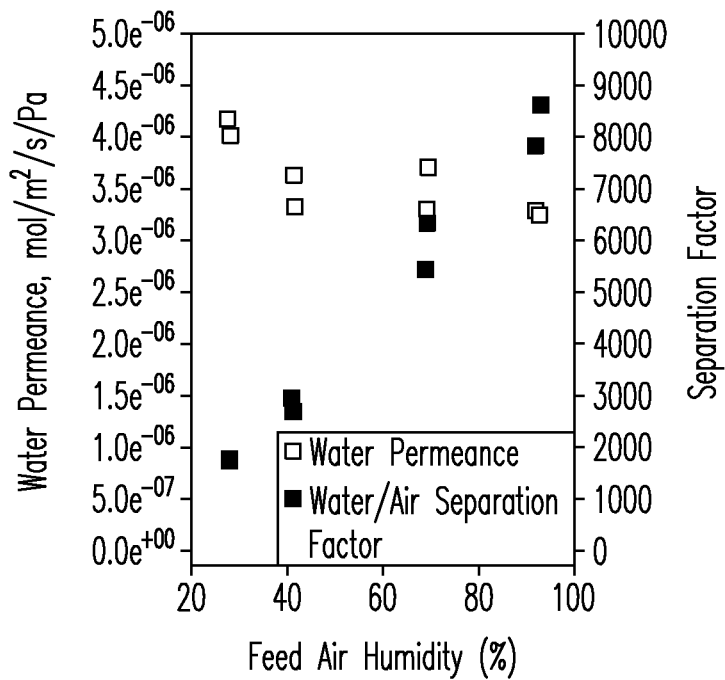

FIG. 10A shows dehumidification performance results for the membrane device for dehumidification of incoming feed air introduced at a flow rate of 25 L/min and a temperature of 21.0° C. As shown in the figure, under conditions of room temperature (21° C.) and constant feed air flow, as relative humidity (RH) of the air increased from 20% to 80%, moisture permeance remained steady. The $H_2O/N_2$ separation factor appears to increase with feed air RH. Increase in $H_2O/N_2$ selectivity with feed air humidity becomes more pronounced for warm air (31° C.). FIG. 10B shows dehumidification performance results the membrane device for dehumidification of feed air introduced at a flow rate of 20 L/min and a temperature of 31.1° C. Data show that the separation factor rapidly increases with feed air humidity for warm air. Moisture permeance for warm air is about 2 to 3 times that of room temperature air, which may be attributed to the increase in molecular diffusivity of water in the zeolite membrane as a function of temperature. Increase in the separation factor with feed air humidity may be attributed to the increased adsorption of water molecules onto pores of the zeolite membrane and blockage of air permeation.

Figure 10C:
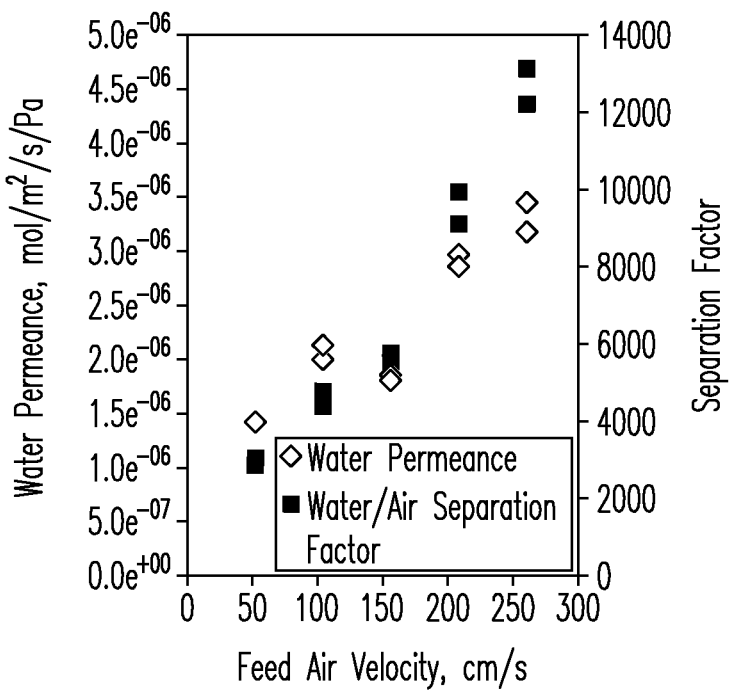
FIGS. 10C-10D show impact of velocity of feed air on performance of the membrane device for dehumidification of feed air.
Figure 10D:
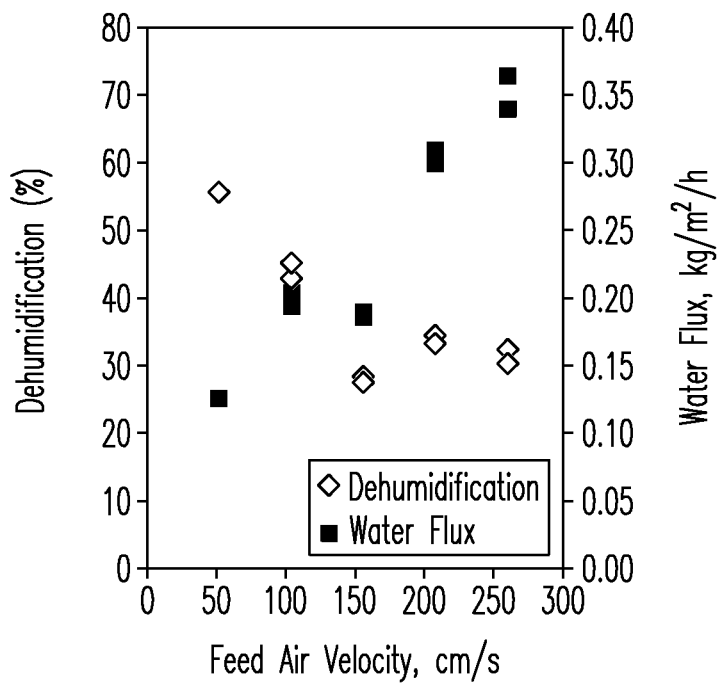

Impact of feed air velocity on dehumidification performance was tested at room temperature. In the current testing system, it was difficult to control the module temperature other than room temperature when the feed air rate was varied. FIGS. 10C-10D show impact of velocity of feed air on performance of the membrane device for dehumidification of feed air. Data show the permeance and separation factor increase sharply with air velocity. The increases resulted from enhancement of water flux at high air velocity. Degree of dehumidification decreases with air velocity because of decreased residence times. For a given membrane module, when permeate pressure, feed air pressure and humidity, and temperature are kept constant, variation in water flux with air velocity may be due to hydrodynamic and mass-transfer effects. By increasing feed air flow rate (equivalent to increasing air velocity), moisture introduced from a ¼" tube with the feed air may be distributed into membrane (1 mm×40 mm) channels more uniformly.

Figure 11:
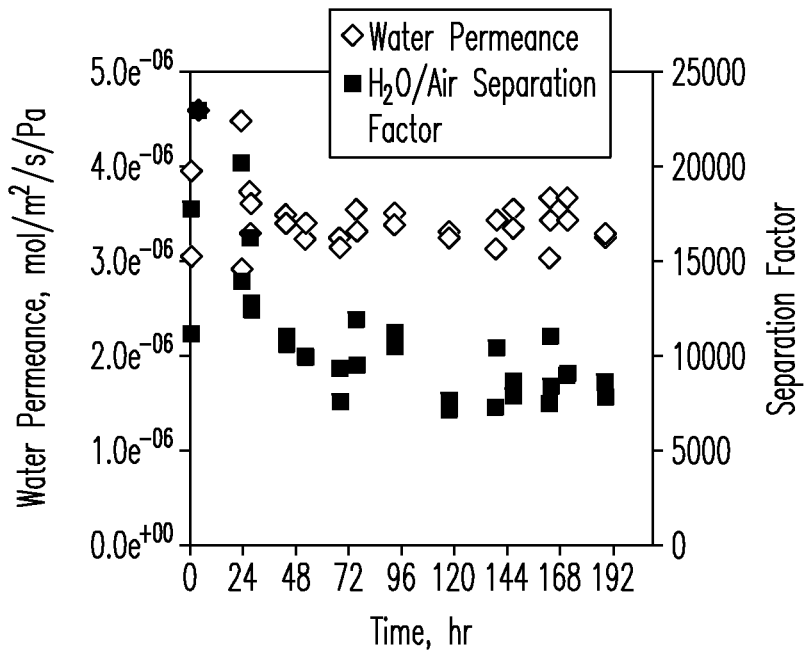
FIG. 11 plots water permeance and separation data for the membrane device as a function of time-on-stream that assesses stability.

Stability of the membrane module was also checked by measuring air dehumidification performances under the same conditions over a period of time. FIG. 11 plots water permeance and separation factor data for the membrane device as a function of time-on-stream for dehumidification of humid warm air (92% RH, 32° C.) that assesses stability of the membrane module. As shown in the figure, a separation factor as high as 20,000 was shown at the beginning and gradually stabilizes at around 7000-8000. Permeance stays at an approximately constant level. Results may be explained by presence of a small fraction of amorphous materials in the membrane. The micro-porous amorphous material such as silica generally is not a stable phase. At the beginning, such amorphous materials may allow moisture permeate while block air. As the amorphous phase gradually becomes polycrystalline, air-leaking large pores may be formed that reduces $H_2O$/air selectivity.

Example 3

Membrane Module for Humidity and Heat Exchange

A counter-current membrane module was fabricated with a single 50 µm-thick zeolite/Ni membrane sheet configured with a 4 cm×10 cm active area and tested for air dehumidification and enthalpy exchange. The module was of a symmetrical design. An identical backing material was placed on both sides of the membrane sheet. One 0.5 mm thick woven polyester sheet was placed on the rear side of the membrane sheet. One 0.5 mm thick woven polyester sheet was placed between the membrane sheet and the cover plate. A feed gas stream was introduced from one side of the membrane sheet. Sweep gas was introduced from the other side of the membrane sheet. The feed gas stream was distributed over the 10 cm wide membrane sheet via three inlet ports. The feed gas stream was flowed over the membrane in a direction opposite to the sweep gas flow stream. Length of the flow path was 4 cm. Humidity exchange was conducted at a constant feed gas flow rate and a constant sweep gas flow rate at room temperature. Both sides of the membrane were maintained at just under atmospheric pressure. Results are summarized in TABLE 4.

TABLE 4 lists test results for humidity exchange with the counter-current module conducted at room temperature (20.9° C.).

| Feed side (Air) | | Sweep side (Ar) | | | Global performance | | |
|---|---|---|---|---|---|---|---|
| Flow rate, | $H_2O$ molar fraction | Flow rate, | $H_2O$ molar fraction | | Water permeance, | $H_2O/N_2$ | |
| L/s | Outlet | Outlet | L/s | Inlet | Outlet | $mol/m^2/s/Pa$ | selectivity | Gain/loss |
| 0.103 | 0.0182 | 0.009 | 0.208 | 0 | 0.0053 | 1.1E−5 | 146.5 | 1.04 |
| 0.103 | 0.01 | 0.0061 | 0.102 | 0 | 0.0042 | 8.0E−6 | 148.3 | 1.14 |
| 0.103 | 0.0182 | 0.0076 | 0.102 | 0 | 0.0070 | 8.4E−6 | 156.8 | 0.94 |
| 0.103 | 0.06 | 0.0038 | 0.102 | 0 | 0.0026 | 8.3E−6 | 71.7 | 1.07 |

Performance of the module was characterized using a global water permeance value and an $H_2O/N_2$ separation factor. Water permeance and separation factors measured from the humidity exchange are close to values measured for air dehumidification. TABLE 5 compares humidity and thermal exchange results obtained for the same module.

TABLE 5

Testing results of counter-current module for humidity and heat exchange.*

| Feed side (house air) | | | | | Sweep side (house air) | | | | Global performance | |
|---|---|---|---|---|---|---|---|---|---|---|
| Inlet | | | Outlet | | Inlet | | outlet | | | |
| T (° C.) | F (l/s) | $x_{H2O}$ | T (° C.) | $x_{H2O}$ | T (° C.) | F (l/s) | T (° C.) | $x_{H2O}$ | $P_{H2O}$ $(mol/m^2/s/Pa)$ | $k_h$ $(w/m^2/k)$ |
| 24.7 | 0.051 | 0.01 | 22.4 | 0.007 | 21.9 | 0.051 | 23.7 | 0.004 | 3.8E−06 | 39.3 |
| 28.1 | 0.051 | 0.01 | 22.9 | 0.0073 | 21.5 | 0.051 | 25.6 | 0.004 | 3.8E−06 | 34.5 |
| 31 | 0.103 | 0.01 | 25.5 | 0.0065 | 23.3 | 0.103 | 27.6 | 0.0054 | 1.2E−05 | 50.8 |
| 32.3 | 0.103 | 0.01 | 25.3 | 0.0043 | 22.5 | 0.103 | 28.8 | 0.0045 | 1.2E−05 | 66.2 |
| 29.6 | 0.154 | 0.01 | 24.9 | 0.0076 | 22.5 | 0.153 | 27 | 0.0043 | 1.2E−05 | 88.5 |
| 32.3 | 0.103 | 0.01 | 25.3 | 0.0043 | 22.5 | 0.103 | 28.8 | 0.0045 | 1.2E−05 | 66.2 |
| 32 | 0.103 | 0.014 | 25.2 | 0.0091 | 22.4 | 0.103 | 28.2 | 0.007 | 1.1E−05 | 58.2 |
| 31.6 | 0.103 | 0.018 | 25.2 | 0.0096 | 22.5 | 0.103 | 27.7 | 0.0087 | 1.1E−05 | 52.2 |

*Feed air linear velocity = 5.13 m/s; Sweep air velocity = 6.12 m/s

The flow path of the membrane sheet is only about 4 cm. Significant changes in temperature and humidity between the inlet and outlet of feed and sweep gas streams with such short residence times (~8 ms) suggest that both heat and humidity exchange rates are rapid. Mass and heat exchange rates of the counter-current module are characterized with global water permeance values and heat exchange coefficient values, respectively. Water permeance increased with the feed and sweep air velocity. Water permeance values in the table are consistent with water permeance values measured from air dehumidification tests. Heat exchange coefficient values listed in the table are in line with gas-phase heat exchange values for conventional metal plate heat exchangers. Thus, membrane device is promising for enthalpy recovery in addition to air dehumidification.

While various preferred embodiments of the invention are shown and described, it is to be distinctly understood that this invention is not limited thereto but may be variously embodied to practice within the scope of the following claims. From the foregoing description, it will be apparent that various changes may be made without departing from the spirit and scope of the present invention as defined by the following claims.

What is claimed is:

1. A membrane device, comprising:
   two or more membrane cassettes disposed in a stack of membrane cassettes comprising at least a first membrane cassette and a second membrane cassette, each membrane cassette comprising
   porous metal membranes disposed on respective faces of a support frame, the support frame defining an open space and comprising a plurality of depressions located on opposing faces of the support frame, and a plurality of permeate or sweep flow slots located on one edge or both opposing edges of the support frame and in fluid communication with the open space;
   wherein a first plurality of depressions on the first membrane cassette are connectable to a second plurality of depressions on the second membrane cassette to form a plurality of feed flow slots in the stack of membrane cassettes, the plurality of feed flow slots and the plurality of permeate or sweep flow slots being located on respective sides of the stack of membrane cassettes with flow paths that transport selected fluids across the surfaces of the porous membranes in the membrane cassettes during operation that provide separation or filtration of particulates or certain molecules from the fluids introduced into the membrane device.

2. The membrane device of claim 1, wherein the support frame comprises a first half frame comprising a plurality of first half frame depressions, and a second half frame, comprising a plurality of second half frame depressions connectable to the plurality of first half frame depressions to form the plurality of permeate or sweep flow slots in the support frame.

3. The membrane device of claim 1, wherein the feed slots and the permeate or sweep flow slots are configured to transport selected fluids or molecules through the membrane device at a 90 degree relative orientation for a cross-current flow pattern or at a 180 degree orientation for a counter-current flow pattern during operation.

4. The membrane device of claim 1, wherein the porous metal membranes are disposed a selected distance apart on the support frame.

5. The membrane device of claim 1, wherein the porous metal membranes comprise a symmetric porous metal membrane.

6. The membrane device of claim 1, wherein the porous metal membranes include pores of a size between about 0.010 μm and about 10 μm and a thickness selected between about 20 μm and about 200 μm.

7. The membrane device of claim 1, wherein the porous metal membranes include a porous backing material comprising pores having a pore opening of from about 0.01 mm to about 5 mm.

8. The membrane device of claim 7, wherein the porous backing material comprises flow channels having a hydraulic diameter of about 0.3 mm to about 3.0 mm.

9. The membrane device of claim 1, wherein the feed slots and/or permeate slots define openings with a height dimension selected between about 0.5 mm and about 5.0 mm.

10. The membrane device of claim 1, wherein at least one of the porous metal membranes in the membrane cassettes includes a zeolite membrane comprising a selected zeolite in a layer of a selected thickness thereon deposited on a porous metal support sheet, the zeolite membrane is structured to remove a selected molecule from a feed stream introduced into the membrane device under a pressure gradient that yields a permeate stream concentrated with the selected molecule.

11. The membrane device of claim 10, wherein the zeolite membrane is a water-selective membrane with pores selective to permeation of water molecules that provide a water permeance greater than or equal to about 1E-06 Mol/m$^2$/Pa/s for selective removal of water from a feed stream introduced into the membrane device.

12. A process, comprising:
delivering a feed stream comprising a component to be filtered or separated therefrom into the plurality of feed flow slots of the membrane device of claim 1, thereby allowing the feed stream to flow across the porous sheet membranes and the component to be transported from the feed stream to a permeate or sweep stream that is subsequently discharged from the permeate or sweep flow slots.

13. The process of claim 12, wherein delivering the feed stream includes flowing the feed stream through the membrane device in a counter-current flow direction or a cross-current flow direction relative to the permeate or sweep stream.

14. The process of claim 12, wherein delivering the feed stream includes providing a pressure gradient disposed between a feed side of the membrane device and a permeate side of the membrane device at or above 1 bar to filter and/or separate the component from the feed stream.

15. The process of claim 12, wherein delivering the feed stream includes delivering the feed stream through the porous metal membranes of the membrane device with a pressure drop of less than 1 bar.

16. The process of claim 12, wherein porous metal membranes of the membrane cassettes comprise a zeolite membrane supported on a porous metal sheet.

17. The process of claim 12, wherein delivering the feed stream includes introducing a feed stream comprising algae into the membrane device and releasing a feed stream from the membrane device comprising a greater concentration of algae therein and a permeate stream from the membrane device comprising water.

18. The process of claim 12, wherein delivering the feed stream comprises introducing a feed stream comprising humid air with a relative humidity of at least about 10% into the membrane device, such that at least 20% of moisture in the feed stream is removed and discharged in a permeate stream.

19. A process for fabrication of the membrane device of claim 1, comprising:
assembling the first and second membrane cassettes together to form the stack of membrane cassettes, wherein assembling comprises aligning the first plurality of depressions on the first membrane cassette with the second plurality of depressions on the second membrane cassette to form the plurality of feed flow slots.

20. The membrane device of claim 1, wherein the porous metal membranes comprise an asymmetric porous metal membrane.

21. The membrane device of claim 1, further comprising porous backing materials in contact with the porous metal membranes, the porous backing materials comprising conjugated channels connectable to the plurality of permeate or sweep flow slots to provide flow paths for a permeate or sweep fluid.

* * * * *